US010694666B2

(12) United States Patent
Baum et al.

(10) Patent No.: US 10,694,666 B2
(45) Date of Patent: Jun. 30, 2020

(54) HARVESTING MACHINE HAVING A MOISTURE REMOVAL MECHANISM AND A CROP CONVERGING MECHANISM

(71) Applicant: Baum Machine, Inc., Appleton, WI (US)

(72) Inventors: Rodger J Baum, Appleton, WI (US); Charles J. Baum, Appleton, WI (US); William J Powel-Smith, Fond du Lac, WI (US)

(73) Assignee: Baum Machine, Inc., Appleton, WI (US)

( * ) Notice: Subject to any disclaimer, the term of this patent is extended or adjusted under 35 U.S.C. 154(b) by 256 days.

(21) Appl. No.: 15/953,675

(22) Filed: Apr. 16, 2018

(65) Prior Publication Data
US 2019/0313579 A1 Oct. 17, 2019

(51) Int. Cl.
A01D 43/00 (2006.01)
A01D 41/06 (2006.01)
(Continued)

(52) U.S. Cl.
CPC ........... A01D 41/06 (2013.01); A01D 43/003 (2013.01); A01D 43/006 (2013.01);
(Continued)

(58) Field of Classification Search
CPC ...... A01D 34/032; A01D 34/04; A01D 34/14; A01D 82/02; A01D 41/06; A01D 41/12;
(Continued)

(56) References Cited

U.S. PATENT DOCUMENTS 2,756,554 A 7/1956 Diehl et al.
2,772,606 A 12/1956 Kelly
(Continued)

FOREIGN PATENT DOCUMENTS

EP 0507390 2/2018
GB 1147069 4/1969

OTHER PUBLICATIONS

New Holland Self-Propelled Forage Havesters, FX28, FX38, FX58, 16 pages, 2001.
(Continued)

Primary Examiner — Robert E Pezzuto
(74) Attorney, Agent, or Firm — Thomas J. Connelly; Northwind IP Law, S.C.

(57) ABSTRACT

A harvesting machine along with a method of operating the harvesting machine. The harvesting machine includes a frame having a first end and a second end. A rotatable pick-up head is pivotally mounted on the first end and is capable of urging a crop into the machine. A cutting mechanism is mounted on a bottom plate for cutting the stems of the plants. A crimper mechanism is positioned downstream of the bottom plate and is capable of compacting the cut stems into a moving web. A moisture removal mechanism is positioned after the crimper mechanism to lower the moisture in the cut stems. A crop converging mechanism is located downstream of the moisture removal mechanism and reduces the width of the moving web into a ribbon. A chopper then chops the ribbon into small pieces so that they can be blown into a storage wagon for transport.

21 Claims, 12 Drawing Sheets

(51) Int. Cl.
*A01D 43/073* (2006.01)
*A01D 43/077* (2006.01)
*A01D 43/08* (2006.01)
*A01D 43/10* (2006.01)
*A01D 91/04* (2006.01)
*A01D 34/03* (2006.01)
*A01D 34/04* (2006.01)
*A01D 34/14* (2006.01)

(52) U.S. Cl.
CPC ......... *A01D 43/073* (2013.01); *A01D 43/077* (2013.01); *A01D 43/087* (2013.01); *A01D 43/10* (2013.01); *A01D 91/04* (2013.01); *A01D 34/032* (2013.01); *A01D 34/04* (2013.01); *A01D 34/14* (2013.01)

(58) Field of Classification Search
CPC .. A01D 43/003; A01D 43/006; A01D 43/073; A01D 43/077; A01D 43/087; A01D 43/10; A01F 15/00; A01F 15/07; A01F 15/10; A01F 15/08; A01F 15/0825; D21F 3/10
USPC ........ 56/12.8, 16.46, 158; 100/88, 169, 171; 460/1, 100, 119
See application file for complete search history.

(56) References Cited

U.S. PATENT DOCUMENTS

| | | | |
|---|---|---|---|
| 2,909,881 A | | 10/1959 | Callahan |
| 3,162,568 A | | 12/1964 | Post |
| 3,527,031 A | * | 9/1970 | Winger ................. F26B 3/343 56/1 |
| 4,207,811 A | * | 6/1980 | Kline ................. A01D 43/003 100/121 |
| 4,287,708 A | * | 9/1981 | Neely, Jr. ............... A01D 43/00 56/13.5 |
| 4,912,914 A | * | 4/1990 | Wingard .............. A01D 43/003 34/113 |
| 5,063,646 A | | 11/1991 | Zeiffer et al. |
| 6,592,721 B1 | | 7/2003 | Anderson et al. |
| 6,711,996 B1 | | 3/2004 | Mackie |
| 8,038,518 B2 | * | 10/2011 | Marvin ................. A01D 41/12 460/100 |
| 9,155,250 B2 | | 10/2015 | Posselius et al. |
| 2017/0096775 A1 | | 4/2017 | Anzel et al. |

OTHER PUBLICATIONS

New Holland Agriculture Competitive Comparison, FR Forage Cruiser, 28 pages, Document No. HFA-30282-13, Feb. 20, 2018 or earlier.

* cited by examiner

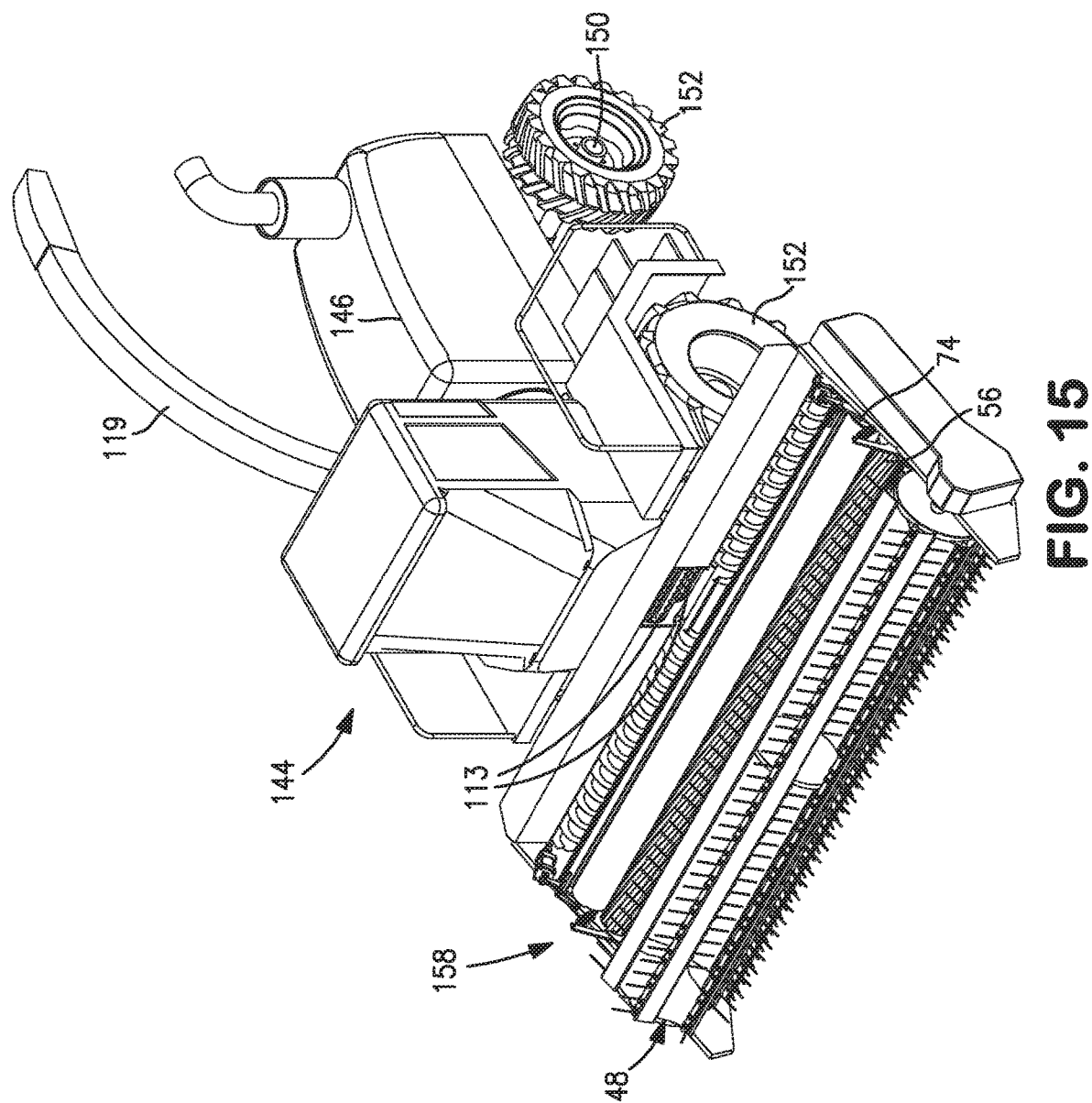

HARVESTING MACHINE HAVING A MOISTURE REMOVAL MECHANISM AND A CROP CONVERGING MECHANISM

FIELD OF THE INVENTION

This invention relates to a harvesting machine having a moisture removal mechanism and a crop converging mechanism. A method of cutting and harvesting a crop with a low moisture content is also disclosed.

BACKGROUND OF THE INVENTION

For centuries, farmers have cut forage crops for animals, such as alfalfa, hay, tall grass, etc., using hand tools. A hand sickle having a semi-circular blade is still used in many parts of the world. With advancement in mechanized machinery, harvesting machines have now replaced hand tools, especially in the more industrialized countries. A harvesting machine can be towed behind a tractor or it can be a self propelled unit. Currently, a cut forage crop is deposited back onto the field in rows where it can be dried by the sun. The rows of crop, such as alfalfa, can be turned over once or twice during the drying process before the dried cut crop is picked up, chopped and blown into a storage wagon and/or taken to a silo for long term storage. The forage crop, especially alfalfa, is used as a feed crop for milking cows.

One major disadvantage with harvesting crops using a conventional haybine is that the weather must be dry for a few days or the farmer could lose a portion of his cut crop to mildew or mold while it is lying in the field. Farmers tend to listen to the weather forecast and if rain is imminent, they will not cut their crop until clear weather is forecast. This is especially true when harvesting alfalfa. If a farmer did cut his forage crop, and then it rained before his crop was fully dried by the sun, he would have to wait longer for his crop to dry. Worst case, the farmer could lose a portion of his crop to mildew and mold.

Now a harvesting machine has been invented which includes a moisture removal mechanism which can remove a large amount of the moisture present in the stems of the harvested crop. The moisture is removed by the harvesting machine immediately after the crop is cut and while the harvesting machine is still in the field. The harvesting machine also includes a crop converging mechanism, located behind the moisture removal mechanism, which gathers the low moisture content crop and directs it to a chopper where it can be chopped and blown into a storage wagon for direct transport to a silo for long term storage.

A header which can be attached to the front of a self-propelled unit or which can be attached to an existing chopper type machine is also taught.

SUMMARY OF THE INVENTION

Briefly, this invention relates to a harvesting machine having a moisture removal mechanism and a crop converging mechanism. This invention also relates to a header which can be attached to the front of a self-propelled unit or which can be attached to an existing chopper type machine.

BRIEF DESCRIPTION OF THE DRAWINGS

FIG. 15 is a perspective view of a self-propelled unit having the header, shown in FIG. 14, attached to the front thereof.

DETAILED DESCRIPTION OF THE INVENTION

Figure 1:
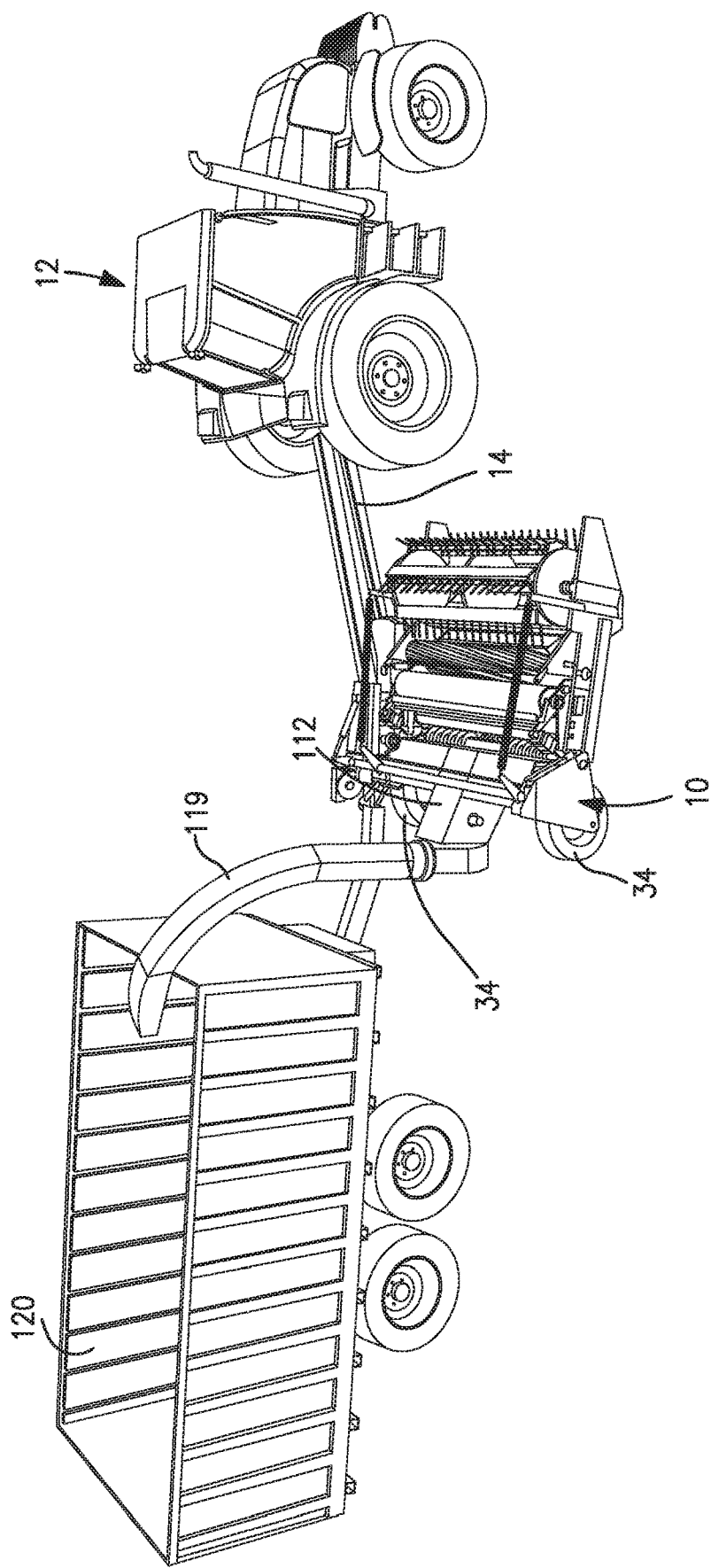
FIG. 1 is a schematic view of the harvesting machine being pulled behind a tractor.

Referring to FIG. 1, a harvesting machine 10 is shown being pulled behind a tractor 12. The size, design and horsepower of the tractor 12 can vary. The harvesting machine 10 is connected to the tractor 12 via a linkage bar 14. In addition, the harvesting machine 10 can be mechanically, hydraulically, pneumatically and/or electrically connected to the tractor 12, as is well known in the art. A power takeoff unit (not shown) on the rear of the tractor 12 can supply mechanical power to the harvesting machine 10. Hydraulic and pneumatic hoses (not shown) can be used to supply pressurized fluid and/or air to the harvesting machine 10. Lastly, electrical wires (not shown) can be used to supply electricity to the harvesting machine 10.

Figure 2:
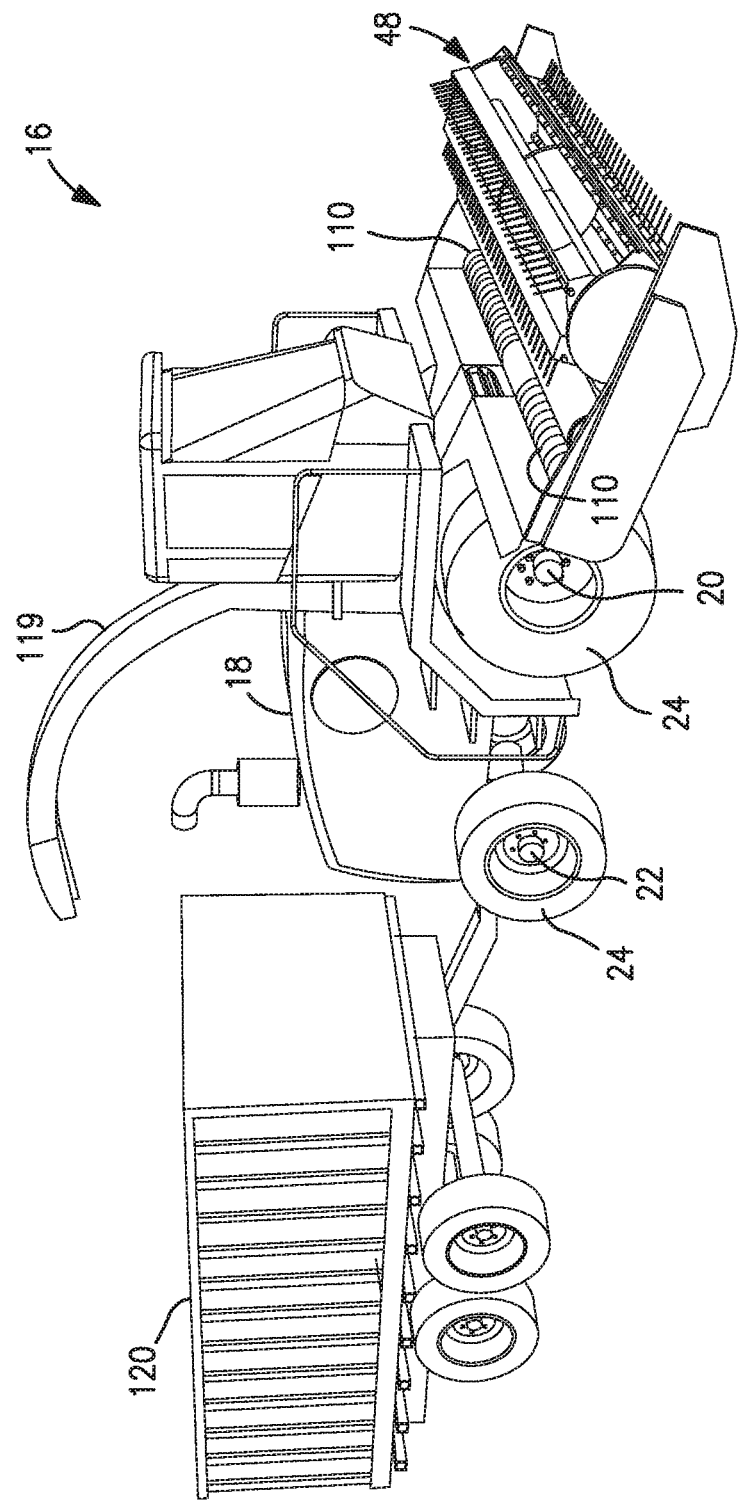
FIG. 2 is a schematic view of the harvesting machine as a self propelled unit.

Referring to FIG. 2, a self-propelled harvesting machine 16 is shown. By "self-propelled" it is meant containing its own means of propulsion. The self-propelled harvesting machine 16 will have its own power source 18, such as an engine, and normally will have two spaced apart axles 20 and 22. Each axle 20 and 22 supports a pair of wheels 24, The discussion below will focus on the harvesting machine 10 which is designed to be pulled by a tractor 12. However, a self-propelled unit 16 could be built having the same internal components as the harvesting machine 10.

Referring to FIGS. 1, and 3-5, the harvesting machine 10, which is designed to be pulled behind a tractor 12, has a frame 26 which has a first end 28 and a second end 30, The first end 28 corresponds to the front of the harvesting machine 10 and the second end corresponds to the rear of the harvesting machine 10. The harvesting machine 10 has at least one axle 32, see FIG. 4, having a pair of wheels 34, 34 rotatably secured thereto, see FIG. 1.

Figure 4:
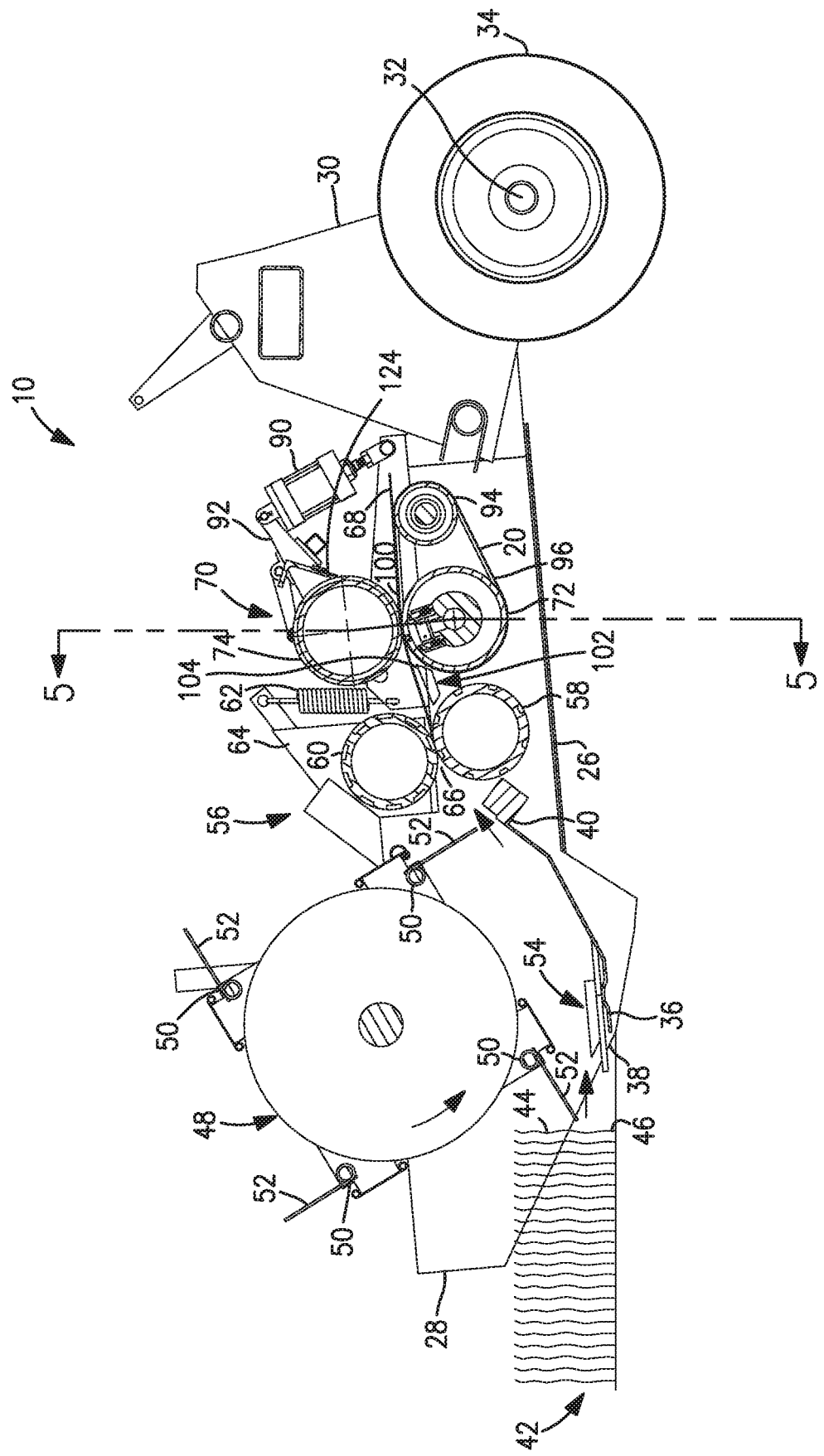
FIG. 4 is a side view of a portion of the harvesting machine, shown in FIG. 3, before the pair of augers.

Referring to FIG. 4, the harvesting machine 10 also has a bottom plate 36 positioned adjacent to the first end 28. The bottom plate 36 has a front edge 38 and a rear edge 40. The bottom plate 36 can be formed from a hard, strong material, such as but not limited to: steel, a steel alloy, metal, a metal alloy, etc. The bottom plate 36 can be an arcuate member or be formed having two or more angled sections. The bottom plate 36 is inclined upward towards the rear edge 40. The bottom plate 36 functions to direct cut stems 44 of a plant 42, such as alfalfa, clover, or some other tall grass, into the harvesting machine 10, once each of the stems 42 have been cut or severed at its base 46.

It should be understood that other kinds of plants 42 could also be harvested using the harvesting machine 10 or 16.

Figure 3:
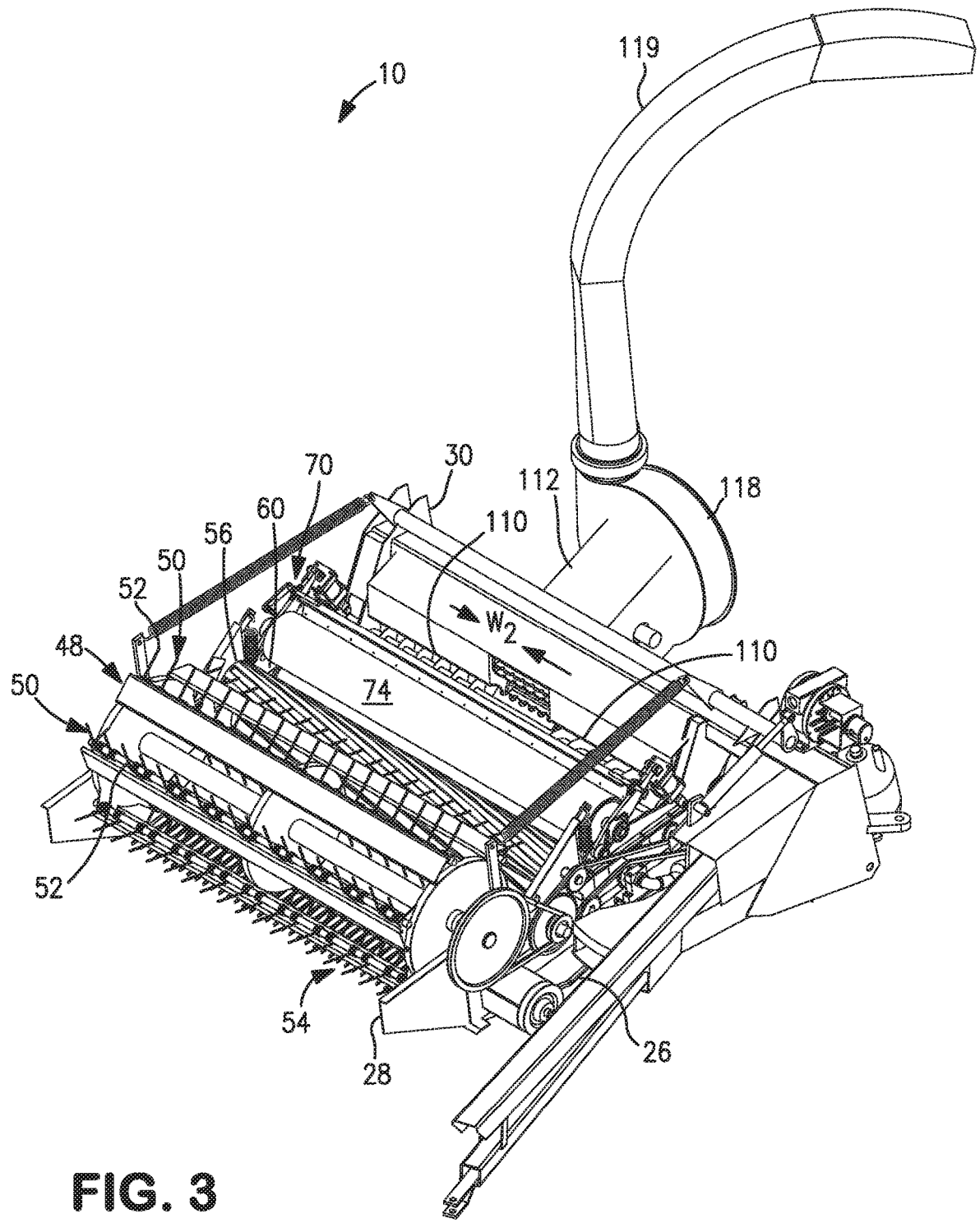
FIG. 3 is a perspective view of the harvesting machine.
Figure 5:
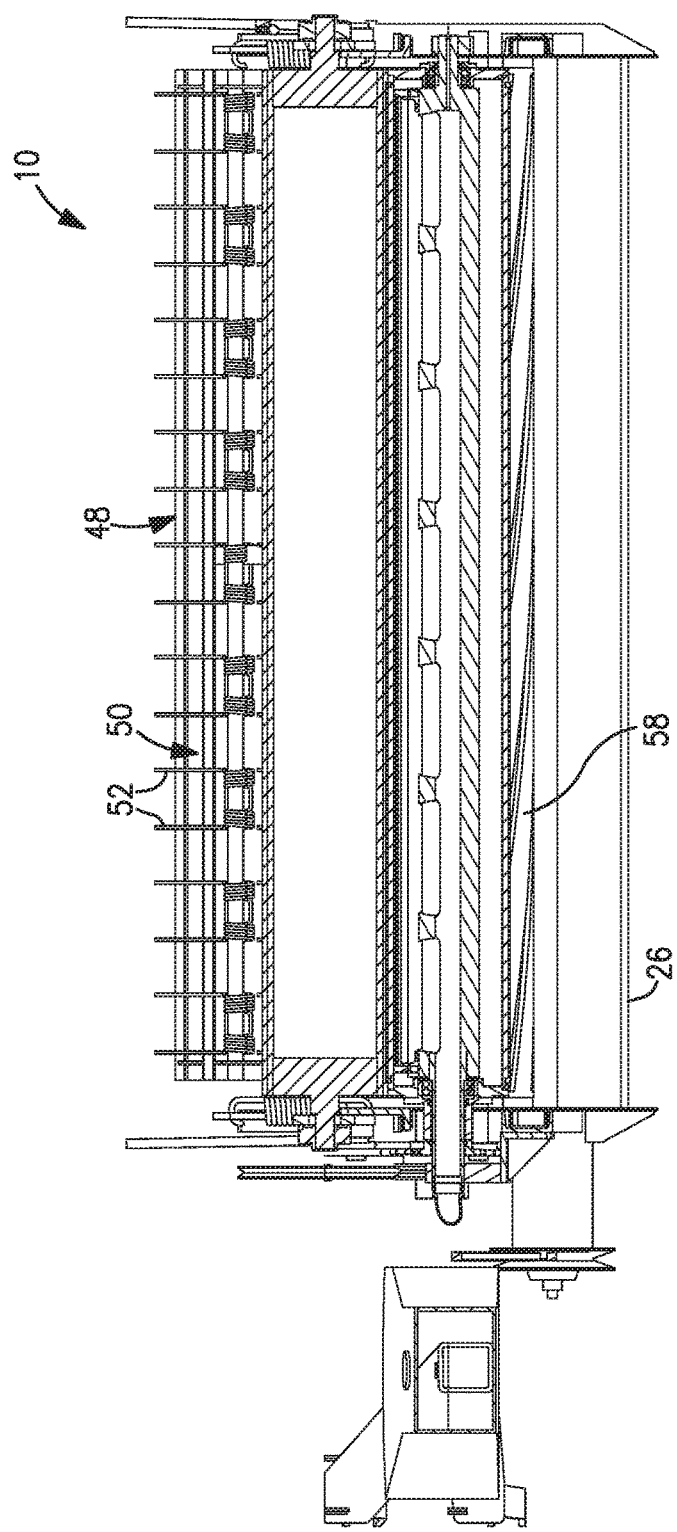
FIG. 5 is a vertical sectional view of FIG. 4 taken along line 5-5 looking towards the front of the harvesting machine.

Still referring to FIGS. 3-5, the harvesting machine 10 also includes a pick-up head 48 rotatably mounted on the first end 28 of the frame 26. The pick-up head 48 could be designed to pivot, if needed. The pick-up head 48 has at least two spaced apart and outwardly extending finger sets 50, 50. Four finger sets 50, 50, 50 and 50 are shown in FIG. 4 with each finger set 50, 50, 50 and 50 spaced approximately 90° apart. When two finger sets 50, 50 are utilized, each finger set 50, 50 can be spaced 180° apart. If three finger sets 50, 50 and 50 are utilized, each finger set 50, 50 and 50 can be spaced 120° apart, Each finger set 50 contains a plurality of fingers 52 spaced apart from one another across the width of the pick-up head 48. The width of the pick-up head 48 can vary. Usually, the width of the pick-up head 48 ranges from between about 72 to 90 inches. Desirably, the width of the pick-up head 48 ranges from between about 76 to 86 inches. More desirably, the width of the pick-up head 48 is about 82 inches. For a pick-up head 48 having an 82 inch width, the number of fingers 52 can range from between about 12 to about 30. Desirably, at least sixteen fingers 52 will span the 82 inch width of the pick-up head 48. More desirably, at least eighteen fingers 52 will span the 82 inch width of the pick-up head 48. The fingers 52 can be equally spaced apart or be arranged at various distances.

The size, shape and dimension of each of the fingers 52 can vary. Normally, each finger 52 can be shaped as an outward extending tine or prong having a length ranging from between about 4 to about 12 inches. Desirably, each finger 52 has an outwardly extending length of at least about 6 inches. Each finger 52 can include a coil spring section, or some other known configuration, to allow it to bend or flex during operation, see FIG. 4. Each finger 52 can be formed from a variety of strong and sturdy materials. Each finger 52 can be formed from various materials, including but not limited to: metal, a metal alloy, steel, a steel alloy, a composite material, fiberglass, or some other strong and sturdy material. As the pick-up head 48 is rotated in a counterclockwise direction, each finger set 50 will sequentially contact the growing plants 42 in a field. The stem 44 of each plant 42 will contain a high moisture content. The moisture content of a plant 42 can vary depending upon the age of the plant, the climate, the soil, and the time of year during which the plant 42 is being harvested. For alfalfa, clover and other tall grasses, the moisture content in the stems 44 can range from between about 50% to about 90%. Desirably, the moisture content in the stems 44 will range from between about 55% to about 75%. More desirably, the moisture content in the stems 44 will range from between about 60% to about 70%.

It should be understood that the leaves of an alfalfa plant contain only a small fraction of the moisture present in the plant 42. Therefore, the harvesting machine 10 focuses on reducing the moisture content of the stems 44, versus removing moisture from the leaves.

As the pick-up head 48 rotates counterclockwise, the finger sets 50 will contact the plants 42 and bend and direct the stems 44 downward onto the bottom plate 36. As the pick-up head 48 continues to rotate, the fingers 52 will move the cut stems 44 up the incline of the bottom plate 36.

Still referring to FIGS. 3-5, the harvesting machine 10 further includes a cutting mechanism 54 mounted on the bottom plate 36 below the pick-up head 48. The cutting mechanism 54 can vary in size, shape and design and can be any cutting mechanism known to those skilled in the art. The cutting mechanism 54 could be a single blade or knife, More desirably, the cutting mechanism 54 is an arrangement of multiple cutting blades or knives. For example, the cutting mechanism 54 could include a plurality of reciprocating sickle blades, a plurality of oscillating blades or knives, multiple cutting heads, etc. The cutting mechanism 54 is designed to cut each of the stems 44 at its respective base 46 as the harvesting machine 10 traverses a crop field.

The harvesting machine 10 also includes a crimper mechanism 56 positioned adjacent to the rear edge 40 of the bottom plate 36. The crimper mechanism 56 includes a bottom crimp roll 58 positioned below a top crimp roll 60, see FIG. 4. The bottom crimp roll 58 can be a metal roll covered with rubber. The top crimp roll 60 can be a steel roll. Both rolls 58 and 60 can have a pattern outer surface. The pattern can vary. A spiral pattern is preferred. The top crimp roll 60 is shown in FIG. 3 as having a spiral pattern.

The bottom crimp roll 58 is a drive roll which can be driven by a motor. The bottom crimp roll 58 rotates clockwise while the top crimp roll 60 rotates counterclockwise. The top crimp roll 60 is biased against the bottom crimp roll 58. The top crimp roll 60 can be biased using a spring 62 and linkage 64, as is shown in FIG. 4. Alternatively, the top crimp roll 60 can be biased against the bottom crimp roll 58 using a hydraulic cylinder, a pneumatic cylinder, an air cylinder, or by some other mechanism known to those skilled in the art.

Still referring to FIG. 4, the linkage 64 can be connected to an end of the top crimp roll 60. The spring 62 is fixed between a stationary portion of the frame 26 and the linkage 62. The spring 62 and linkage 64 can be adjusted to increase or decrease the amount of pressure the top crimp roll 60 will exert on the bottom crimp roll 58. The top crimp roll 60 contacts the outer surface of the bottom crimp roll 58. The top crimp roll 60 can be described as a follower roll wherein it follows the rotation of the bottom crimp roll 58, just in an opposite direction. The top crimp roll 60 is rotatably connected to the bottom crimp roll 58.

A first nip 66 is formed between the bottom crimp roll 58 and the top crimp roll 60. The cut stems 44 are directed up the inclined surface of the bottom plate 36 by the fingers 52 and through the first nip 66 to form a moving web 68. The height of the first nip 66 can vary. The height of the first nip 66 can range from between about 0.05 inches to about 0.5 inches. Desirably, the height of the first nip 66 can range from between about 0.1 inches to about 0.4 inches. More desirably, the height of the first nip 66 can range from between about 0.15 inches to about 0.35 inches. Even more desirably, the height of the first nip 66 is less than about 0.3 inches. Most desirably, the height of the first nip 66 is less than about 0.25 inches.

Figure 6:
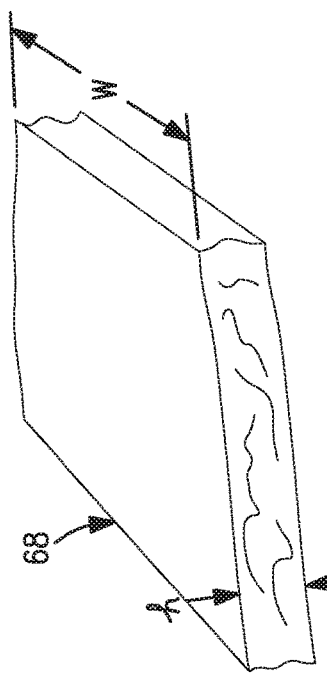
FIG. 6 is a perspective view of a moving web.

Referring now to FIG. 6, the moving web 68 can vary in height h and width w. The moving web 68 has a height h which ranges from between about 0.05 inches to about 0.25 inches. Desirably, the moving web 68 has a height h ranging from between about 0.05 to about 0.20 inches. More desirably, the moving web 68 has a height h ranging from between about 0.1 to about 0.2 inches. Even more desirably, the moving web 68 has a height h ranging from between about 0.1 to about 0.15 inches. Most desirably, the moving web 68 has a height h of less than about 0.13 inches.

The moving web 68 has a width w which can be equal to the width of the pick-up head 48. Alternatively, the moving web 68 has a width w which is less than the width of the pick-up head 48. In order to reduce the number of parts needed and construct the harvesting machine 10 at an economical cost, the moving web 68 usually has a width w which is approximately equal to the width of the pick-up head 48.

Referring again to FIGS. 3-5, the bottom crimp roll 58 can be a rubber coated metal roll having a pattern formed thereon. The pattern can vary. A spiral pattern works well for it facilitates pulling the stems 44 through the first nip 66, see FIG. 5. The thickness of the rubber coating can vary but is generally about 0.12 inches or more.

Still referring to FIGS. 3-5, the harvesting machine 10 further includes a moisture removal mechanism 70. The moisture removal mechanism 70 is positioned above and behind the crimper mechanism 56. The moisture removal mechanism 70 includes a suction roll 72 positioned below a press roll 74. The suction roll 72 is a drive roll which can be driven by a motor. The suction roll 72 is rotated clockwise. The press roll 74 is biased towards the suction roll 72, such as by a spring, a hydraulic cylinder, a pneumatic cylinder, an air cylinder, or by some other mechanism known to those skilled in the art. The press roll 74 can be described as a follower roll. The press roll 74 rotates counterclockwise.

Figure 7:
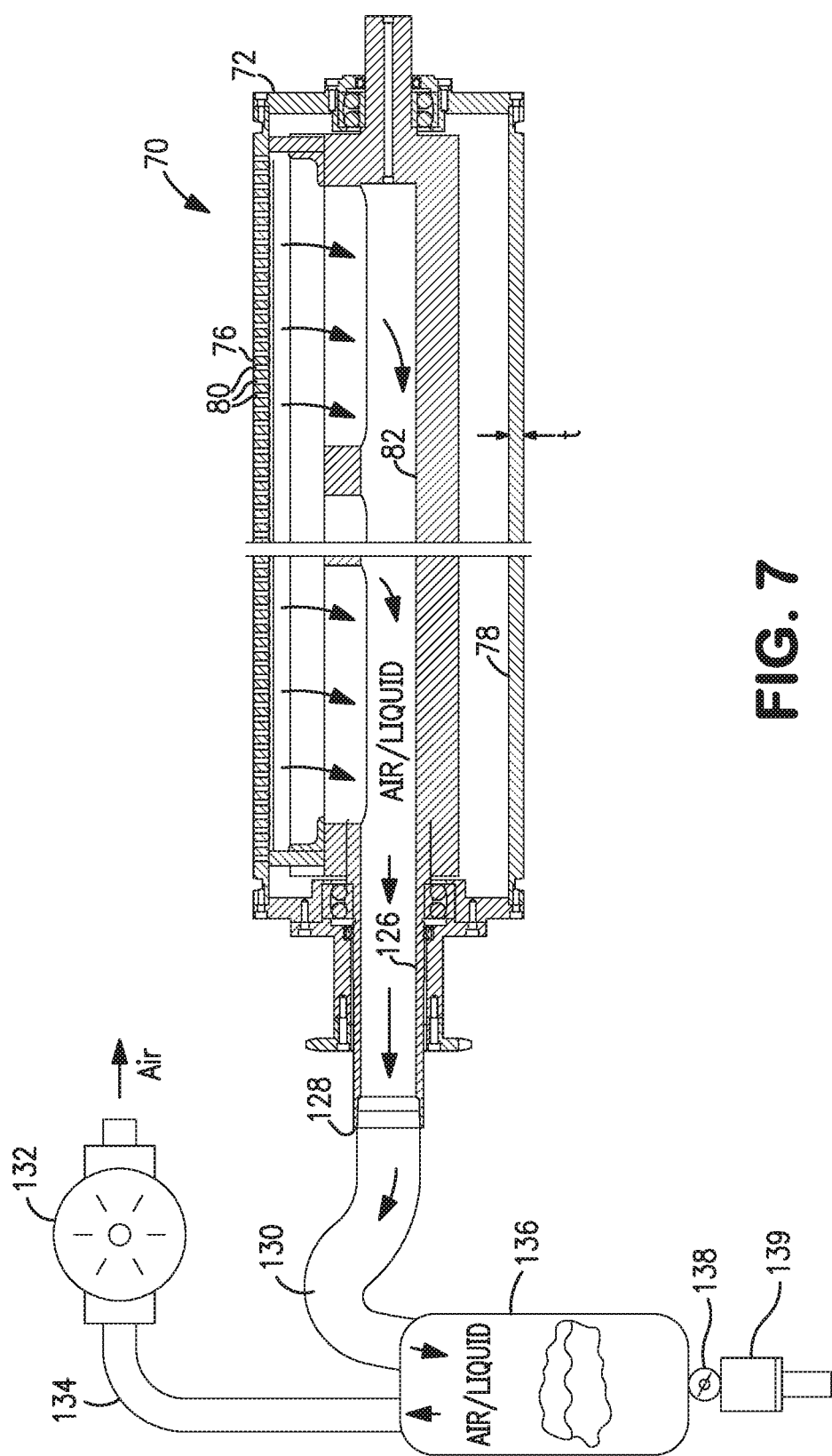
FIG. 7 is a cross-sectional view of the suction roll.
Figure 8:
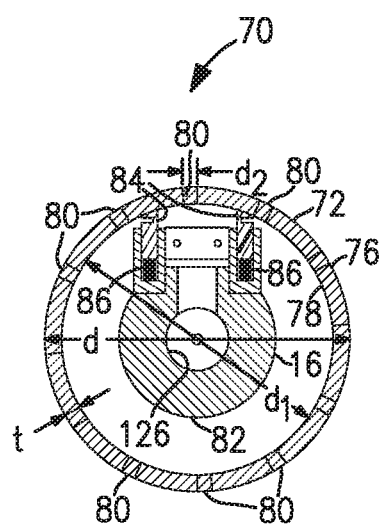
FIG. 8 is a vertical section view of the suction roll taken along line 8-8.

Referring to FIGS. 7 and 8, the suction roll 72 is a hollow cylinder or tube which can be formed from various materials. Desirably, the suction roll 72 is formed from aluminum or an aluminum alloy. The suction roll 72 has an outside diameter d and an inside diameter $d_1$, see FIG. 8. The outside diameter d of the suction roll 72 can range from between about 8 inches to about 12 inches. Desirably, the outside diameter d of the suction roll 72 is greater than about 9 inches. More desirably, the outside diameter d of the suction roll 72 ranges from between about 9 inches to about 10 inches. Even more desirably, the outside diameter d of the suction roll 72 is about 9.5 inches.

It should be understood that the above roll diameters are for a harvesting machine 10 with cutting widths of about 80 inches. As the cutting width of a harvesting machine 10 increases, the roll diameters would also increase. A typical rule of thumb for roll diameter is to use a 10/1 ratio as a minimum (i.e., an 80" long roll would be given an 8" diameter), In a self propelled harvesting machine 16, the cutting widths can go up to about 20 feet (240 inches) or greater. In these types of harvesting machines 16, the roll diameter could be about 24" or greater.

The inside diameter $d_1$ of the suction roll 72 can range from between about 0.1 inches to about 0.3 inches less than the outside diameter d. Desirably, the inside diameter $d_1$ of the suction roll 72 ranges from between about 7.7 inches to about 11.9 inches. More desirably, the inside diameter $d_1$ of the suction roll 72 is greater than about 8.7 inches.

The thickness t of the suction roll 70 can range from between about 0.1 inches to about 0.3 inches, see FIG. 8. Desirably, the thickness t of the suction roll 72 ranges from between about 0.15 inches to about 0.25 inches. More desirably, the thickness t of the suction roll 72 ranges from between about 0.18 inches to about 0.25 inches. Even more desirably, the thickness t of the suction roll 72 ranges from between about 0.2 inches to about 0.25 inches.

The suction roll 72 has an exterior surface 76, an interior surface 78, and a circumference. A plurality of apertures 80 are formed through the thickness t of the hollow suction roll 72. The apertures 80 can vary in size and/or diameter. Desirably, each of the plurality of apertures 80 has a circular configuration. It is also desirable that each of the plurality of apertures 80 has the same diameter. Each of the plurality of apertures has a diameter $d_2$. The diameter $d_2$ is relatively small and can vary. The diameter $d_2$ of each of the plurality of apertures 80 can range from between about 0.05 inches to about 0.25 inches. Desirably, the diameter $d_2$ of each of the plurality of apertures 80 ranges from between about 0.1 inches to about 0.2 inches. More desirably, the diameter $d_2$ of each of the plurality of apertures 80 ranges from between about 0.15 inches to about 0.2 inches. Even more desirably, the diameter $d_2$ of each of the plurality of apertures 80 is less than about 0.25 inches.

If desired, some of the plurality of apertures 80 could be formed to have different diameters but this would increase the cost of manufacturing the suction roll 72.

Figure 9:
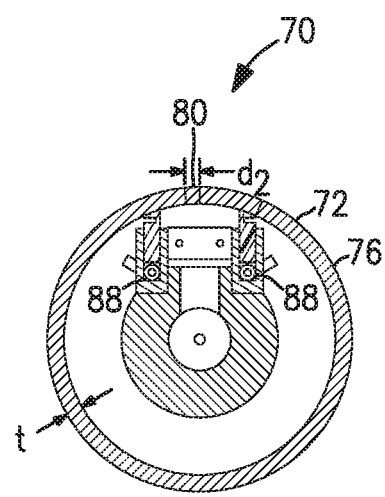
FIG. 9 is a cross-sectional view of the suction roll shown in FIG. 7 showing a pair of air load tubes used to bias the pair of seals outward against the interior surface of the suction roll.

Still referring now to FIGS. 7-9, a stationary member 82 is positioned within the hollow suction roll 72. The stationary member 82 can vary in construction. The stationary member 82 includes a pair of seals 84, 84 arranged to form an opening into a center portion of the stationary member 82. The size, shape and design of each of the pair of seals 84, 84 can vary. Each of the pair of seals 84, 84 is movable and each is biased outward against the interior surface 78 of the hollow suction roll 72. Each of the pair of seals 84, 84 can be biased outward against the interior surface 78 of the hollow suction roll 72 by a spring 86. Alternatively, each of the pair of seals 84, 84 can be biased outward against the interior surface 78 of the hollow suction roll 72 by a pair of air load tube 88, 88, see FIG. 9. Furthermore, each of the pair of seals 84, 84 can be biased outward against the interior surface 78 of the hollow suction roll 72 by some other mechanism known to those skilled in the art.

The pair of seals 84, 84 can be formed from various materials. An excellent material from which to form the pair of seals 84, 84 is a high-strength, resilient synthetic polymer. A particular polymer from which the pair of seals 84, 84 can be formed is nylon. By "nylon" it is meant any of a family of high-strength, resilient synthetic polymers containing recurring amide groups. Various types of nylon can also be used since seals containing nylon tend to be strong, resilient and pliable. The pair of seals 84, 84 could also be formed from other materials known to those skilled in the art.

The purpose of the pair of seals 84, 84 is to form a small zone of negative pressure within the stationary member 82. The stationary member 82 is designed to pull a vacuum or negative pressure so that moisture, in the form of a liquid, can be drawn out of the stems 44 in the moving web 68 and be removed through the suction roll 72 and the stationary member 82. The stationary member 82 can be constructed to pull a negative pressure ranging from between about −5 pounds per square inch (psi) to about −10 psi. Desirably, the stationary member 82 should be built and designed to pull a negative pressure ranging from between about −6 psi to about −9 psi. More desirably, the stationary member 82 should be built and designed to pull a negative pressure of at least −7 psi. Even more desirably, the stationary member 82 should be built and designed to pull a negative pressure of at least −8 psi. Most desirably, the stationary member 82 should be built and designed to pull a negative pressure of at least −9 psi.

Returning again to FIG. 4, the press roll 74 can be formed from various materials. Desirably, the press roll 74 is a steel roll coated with rubber. The press roll 74 can be biased towards the suction roll 72 by various means, such as by a mechanical device, such as a spring, a hydraulic cylinder, a pneumatic cylinder, by air pressure, by a mechanical/electrical device, or by some other means known to those skilled in the art. In FIG. 4, a pneumatic cylinder 90 and is used to bias the press roll 74 towards the suction roll 72, One end of the pneumatic cylinder 90 can be secured to a portion of the frame 26 and the opposite end is attached to a linkage 92. The linkage 92 is connected to an end of the press roll 74. One can adjust the amount of pressure the press roll 74 will apply by adjusting the setting of the pneumatic cylinder and/or adjusting the linkage 92.

The press roll 74 can have a smaller diameter, the same diameter, or a larger diameter than the suction roll 72. Desirably, the press roll 74 will have the same diameter or a larger diameter than the suction roll 72. More desirably, the press roll 74 has a larger diameter than the suction roll 72. For example, if the suction roll 72 has a diameter d of 9.5 inches, the press roll 74 can have a diameter ranging from about 9.6 to about 10 inches. By constructing the press roll 74 to have an equal or slightly larger diameter than the suction roll 72, one can better control the amount of pressure the press roll 74 will exert on a wire belt 96, which will be discussed below.

Desirably, the press roll 74 and the suction roll 72 will have the same length so as to easily fit into the harvesting machine 10. The press roll 74 can be adjusted to exert a pressure ranging from between about 50 pounds per linear inch (pli) to about 100 pli on the suction roll 70 via the wire belt 96. Desirably, the press roll 74 can be adjusted to exert a pressure ranging from between about 60 pli to about 90 pli on the suction roll 70 via the wire belt 96. More desirably, the press roll 74 can be adjusted to exert a pressure ranging from between about 65 pli to about 85 pli on the suction roll 70 via the wire belt 96. Even more desirably, is the press roll 74 can be adjusted to exert a pressure of at least 70 pli on the suction roll 70 via the wire belt 96. Most desirably, the press roll 74 can be adjusted to exert a pressure of at least 75 pli on the suction roll 70 via the wire belt 96.

The press action between the suction roll 72 and the press roll 74 squeezes the plant stems and this squeezing in combination with the rolling action of the suction roll 72 and the press roll 74 forces the liquid out of the plant stems. The released liquid is then drawn into the suction roll 72.

Still referring now to FIG. 4, the moisture removal mechanism 70 also includes an idler roll 94 positioned behind the suction roll 72. The idler roll 94 has a smaller diameter than the suction roll 72. The idler roll 94 is not a driven roll but instead is a follower roll. The idler roll 94 can be formed from a variety of materials. Normally, the idler roll 94 is made of steel, a steel alloy, metal, a metal alloy, or some other material which is strong and durable. Desirably, the suction roll 72 has a longitudinal central axis and the idler roll 94 has a longitudinal central axis, and the longitudinal central axis of the idler roll 94 is located in a plane positioned above and downstream of the longitudinal central axis of the suction roll 72. This feature permits a movable wire belt 96, explained below, to move the moving web 68 of cut stems 44 away from the moisture removal mechanism 70. Desirably, the portion of the moving wire belt 96, located between the upper surface of the suction roll 72 and the upper surface if the idler roll 94, is horizontally aligned.

Figure 10:
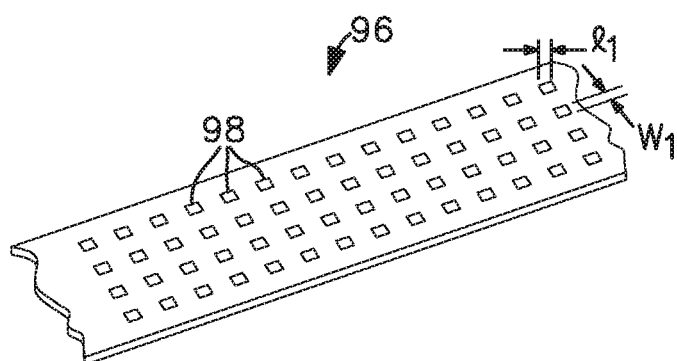
FIG. 10 is a top view of a section of a wire belt having a plurality of apertures formed therethrough.

Referring now to FIGS. 4 and 10, the wire belt 96 forms a closed loop around both the suction roll 72 and the idler roll 94. The wire belt 96 can be formed from various materials. For example, the wire belt 96 can be formed by weaving fine metal or steel wires into a screen. The wire belt 96 could also be formed from thin strands of a thermoplastic or a composite material which are formed into a screen. The movable wire belt 96 has a plurality of small apertures 98 formed therethrough. The apertures 98 can vary in size, shape and dimensions. The apertures 98 can be of the same size or be of a different size. Normally, all of the apertures 98 are identical in size and shape. The apertures 98 are typically rectangular or square in shape. For an aperture 98 having a rectangular configuration, each aperture 98 can have a length $l_1$ ranging from between about 0.025 inches to about 0.035 inches, and a width $w_1$ ranging from about 0.01 inches to about 0.02 inches. Desirably, for an aperture 98 having a rectangular configuration, each aperture 98 can have a length $l_1$ ranging from between about 0.027 inches to about 0.033 inches, and a width $w_1$ ranging from about 0.012 inches to about 0.019 inches. More desirably, for an aperture 98 having a rectangular configuration, each aperture 98 can have a length $l_1$ ranging from between about 0.028 inches to about 0.032 inches, and a width $w_1$ ranging from about 0.017 inches to about 0.018 inches. Even more desirably, each rectangular shaped aperture 98 can have a length $l_1$ of about 0.032 inches and a width $w_1$ of about 0.018 inches. A preferred size is an aperture 98 having a length $l_1$ of about 0.03 inches, and a width $w_1$ of about 0.01 inches.

It should be understood that each of the plurality of apertures 98 formed in the wire belt 96 is at least about 25% smaller in area than each of the apertures 80 formed in the suction roll 72. Desirably, each of the plurality of apertures 98 formed in the wire belt 96 is at least about 30% smaller in area than each of the apertures 80 formed in the suction roll 72. More desirably, each of the plurality of apertures 98 formed in the wire belt 96 is at least about 40% smaller in area than each of the apertures 80 formed in the suction roll 72. Even more desirably, each of the plurality of apertures 98 formed in the wire belt 96 is at least about 50% smaller in area than each of the apertures 80 formed in the suction roll 72. Most desirably, each of the plurality of apertures 98 formed in the wire belt 96 is at least about 60% smaller in area than each of the apertures 80 formed in the suction roll 72. This is important, because the plurality of apertures 98 formed in the movable wire belt 96 will prevent debris from the cut stems 44 from entering the apertures 80 formed in the suction roll 72. By forming each of the apertures 98 to a smaller size than the apertures 80, one can be assured that no large particles of debris will enter the suction roll 72 and fowl it up.

The wire belt 96 is made movable by spanning a portion of the circumference of the driven suction roll 72. Desirably, the wire belt 96 will span is at least 180° of the circumference of the suction roll 72. More desirably, the wire belt 96 will span from between about 180° to about 220° of the circumference of the suction roll 72. More desirably, the wire belt 96 will span from between about 180' to about 200° of the circumference of the suction roll 72. Even more desirably, the wire belt 96 will span from between about 180° to about 190° of the circumference of the suction roll 72.

The idler roll 94 creates a predetermined tension in the wire belt 98 and keeps it taunt. The idler roll 94 can be spaced at varying distances from the suction roll 72. Desirably, the center of the idler roll 94 is spaced within about 12 inches of the center of the suction roll 72.

It should be understood that each of the plurality of apertures 98 formed in the wire belt 96 is smaller than each of the plurality of apertures 80 formed in the suction roll 72. This is an important feature for it assures that none of the stems 44 or portions thereof will be sucked into the suction roll 72 through the apertures 80.

Referring again to FIG. 4, one can see that a second nip 100 is formed between the press roll 74 and the movable wire belt 96. The size of this second nip 100 can vary. The size of the second nip 100 can range from between about 0.05 inches to about 0.5 inches. Desirably, the size of the second nip 66 can range from between about 0.1 inches to about 0.4 inches. More desirably, the size of the second nip 100 can range from between about 0.15 inches to about 0.35 inches. Even more desirably, the size of the second nip 100 is less than about 0.3 inches. Most desirably, the size of the second nip 100 is less than about 0.25 inches.

The movable wire belt 96 functions as a conveyor for moving the moving web 68 of cut stems 44 through the second nip 100 and away from the moisture removal mechanism 70. As the moving web 68 is passed through the second nip 100, the moisture content in the cut stems 44 is lowered and reduced. A standing crop of alfalfa, and certain tall grasses, in a field can have a relatively high moisture content. By "relatively high moisture content" it is meant a moisture content ranging from between about 40% to about 90%. Depending upon the time of year, the soil makeup, the time of day when the alfalfa is being harvested, the kind of weather the alfalfa is being harvested in, the time of year in which the alfalfa is being harvested, the variety of alfalfa, the geographical location of the farm, etc., a standing crop of alfalfa in a field can have a moisture content ranging from between about 45% to about 85%. Desirably, a standing crop of alfalfa in a field can have a moisture content ranging from between about 50% to about 80%. More desirably, a standing crop of alfalfa in a field can have a moisture content ranging from between about 50% to about 75%. Even more desirably, a standing crop of alfalfa in a field can have a moisture content of at least about 55%. Most desirably, a standing crop of alfalfa in a field can have a moisture content of at least about 60%.

By harvesting the alfalfa crop and certain tall grasses with the harvesting machine 10, one can lower or reduce the moisture content in the cut stems 44 from between about 10% to about 50%. Desirably, by harvesting the alfalfa and certain tall grasses with the harvesting machine 10, one can lower or reduce the moisture content in the cut stems 44 from between about 15% to about 45%. More desirably, by harvesting the alfalfa and certain tall grasses with the harvesting machine 10, one can lower or reduce the moisture content in the cut stems 44 from between about 20% to about 40%. Even more desirably, by harvesting the alfalfa and certain tall grasses with the harvesting machine 10, one can lower or reduce the moisture content in the cut stems 44 by at least about 30%. Most desirably, by harvesting the alfalfa and certain tall grasses with the harvesting machine 10, one can lower or reduce the moisture content in the cut stems 44 by at least about 35%.

The moisture removal mechanism 70 can remove at least about 20% of the moisture content in the cut stems 44. Desirably, the moisture removal mechanism 70 can remove at least about 25% of the moisture content in the cut stems 44. More desirably, the moisture removal mechanism 70 can remove at least about 30% of the moisture content in the cut stems 44.

The moisture contained in the stems 44 of an alfalfa plant 42 and the moisture contained in the stems 44 of certain tall grasses can be removed by the is harvesting machine 10 in the form of a liquid. The leaves of the alfalfa plant 42 and the tips of certain tall grasses usually contain only a very small amount of moisture. Because of this, the harvesting machine 10 extracts moisture from the cut stems 44 and not from the leaves of the plant 42. The liquid removed from the cut stems 44 has a nutritional value. Therefore, it is advantageous to capture this liquid and use it as a feed supplement, as a fertilizer, or for some other purpose. The liquid that is removed could also be deposited back onto the field from which the alfalfa was harvested and be used as a fertilizer. By "fertilizer" it is meant any of a large number of natural and synthetic materials, including manure and nitrogen, phosphorous, and potassium compounds, spread on or worked into soil to increase its capacity to support plant growth.

Referring again to FIG. 4, a support plate 102 is positioned between the crimper mechanism 56 and the moisture removal mechanism 70. The support plate 102 has a flat, smooth upper surface 104. The support plate 102 functions to prevent the cut stems 44 or portions thereof from falling between the crimper mechanism 56 and the moisture removal mechanism 70. The size, length and overall shape of the support plate 102 can vary.

Figure 11:
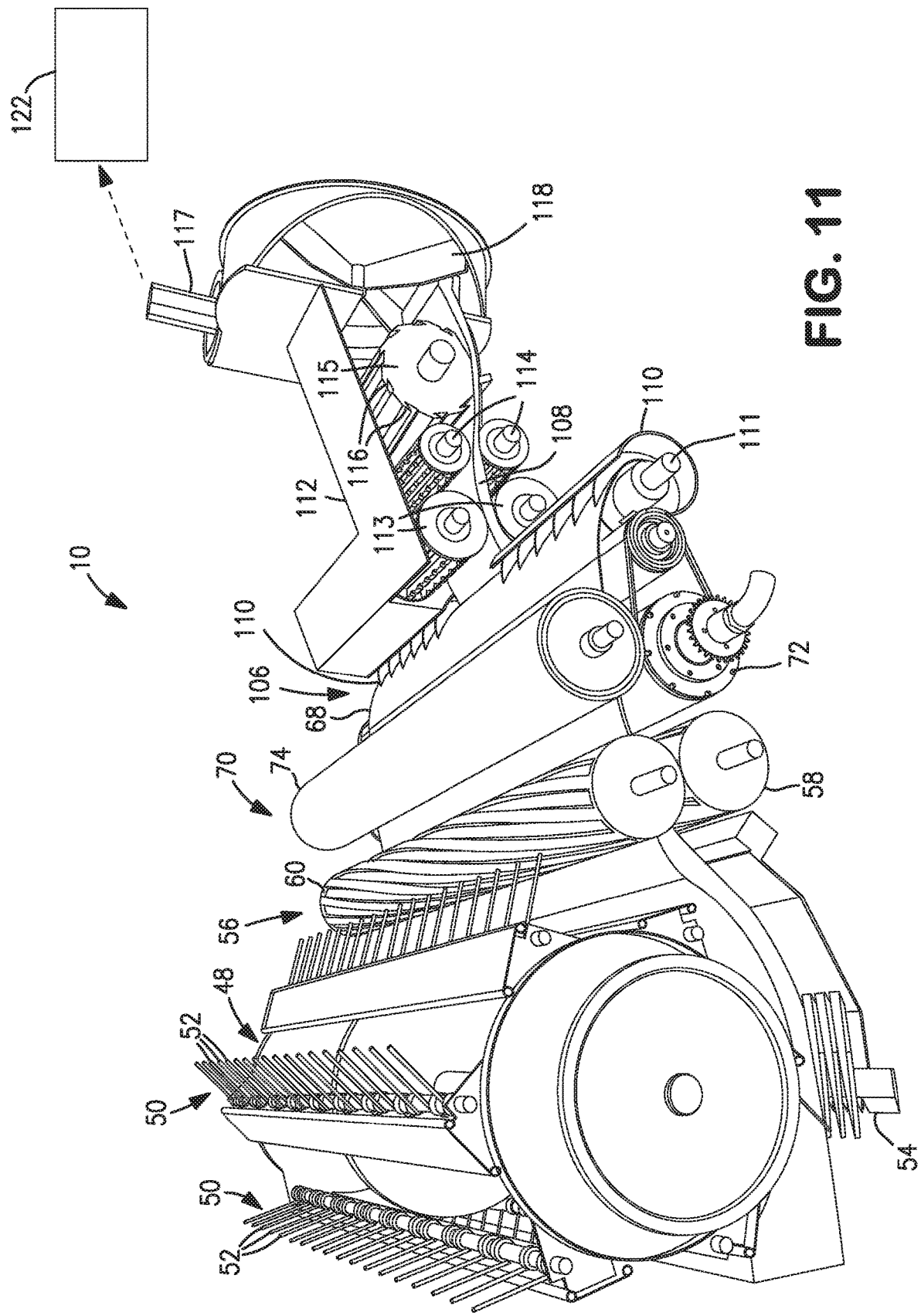
FIG. 11 is a perspective view of the crop converging mechanism.

Referring to FIGS. 3 and 11, a crop converging mechanism 106 is located downstream of the moisture removal mechanism 70. The crop converging mechanism 106 reduces the width of moving web 68 into a narrow ribbon 108 having a width $w_2$, see FIG. 3. The narrow ribbon 108 has a width $w_2$ of about 30 inches or less. Desirably, the ribbon 108 has a width $w_2$ of about 28 inches or less. More desirably, the narrow ribbon 108 has a width $w_2$ of about 26 inches or less. Even more desirably, the narrow ribbon 108 has a width $w_2$ of about 24 inches. The crop converging mechanism 106 can vary in construction and size. As depicted in FIG. 11, the crop converging mechanism 106 includes a pair of rotating augers 110, 110 aligned on a common shaft 11. In other words, the pair of augers 110, 110 is aligned on a common axis. One auger 110 can be a right handed auger and the other auger 110 can be a left handed auger. As the shaft rotates, the pair of augers 110, 110 function to reduce the width of the moving web 68. The pair of augers 110, 110 can forcibly reduce the moving web 68 into a narrow ribbon 108 having a desired width $w_2$. One or more movable belts or some other kind of mechanical equipment, known to those skilled in the art, could also be used in place of the pair of augers 110, 110 to reduce the width of the moving web 68 into a narrow ribbon 108 having a width $w_2$.

Referring again to FIGS. 1 and 11, the harvesting machine 10 further includes a conveyor chute 112 positioned downstream of the crop converging mechanism 106. The conveyor chute 112 is sized to handle the narrow ribbon 108 of cut stems 44. The conveyor chute 112 can be constructed of various materials. Typical materials include steel, a steel alloy, metal, a metal alloy or any other material known to those skilled in the art. The conveyor chute 112 can house a first pair of feed rolls 113, 113, a second pair of feed rolls 114, 144, if needed, and a chopper 115. The first and second pairs of feed rolls 113, 113 and 114, 114 function to route the narrow ribbon 108 of cut stems 44 to a chopper 115. The chopper 115 is positioned downstream of the crop converging mechanism 106 and towards the opposite end of the conveyor chute 112. The chopper 115 can be a rotary knife or other kind of cutting apparatus known to those skilled in the art. The chopper 115 can include several cutting blades 116. The chopper 115 is designed to chop the narrow ribbon 108 of cut stems 44 into small pieces 117, A blower 118 is positioned downstream of the chopper 115 and is designed to blow or move the small pieces 117 up and through a spout 119, see FIG. 1, The spout 119 can route the small pieces 117 into a storage wagon 120 for transport to a storage facility 122, such as a silo or grain bin, see FIG. 11.

Returning again to FIG. 4, a doctor blade 124 is positioned adjacent to the exterior surface 76 of the press roll 74 and downstream of the second nip 100. The doctor blade 124 can be formed from various materials. Usually, the doctor blade 124 is formed from steel or metal. The doctor blade 124 can physically contact or touch the exterior surface 76 of the press roll 74 or be slightly removed from the exterior surface 76. Desirably, the doctor blade 124 physically contacts the exterior surface 76 of the press roll 74. Alternatively, the doctor blade 124 is situated within about 0.125 inches of the exterior surface 76 of the press roll 74. The doctor blade 124 can vary in configuration and thickness but should generally be a rectangular blade equivalent to the blade on a putty knife. The thickness of the doctor blade 124 can range from between about 0.10 inches to about 0.20 inches. The doctor blade 124 is located downstream of the second nip 100. The doctor blade 124 is a stationary member which functions to remove any stems 44, particles, debris or portions thereof, that may cling to the exterior surface 76 of the press roll 74. In essence, the doctor blade 124 keeps the exterior surface 76 of the press roll 74 clean and free of particles and debris. As depicted, the doctor blade 124 can be positioned from about 2 inches to about 4 inches above the wire belt 96.

Figure 12:
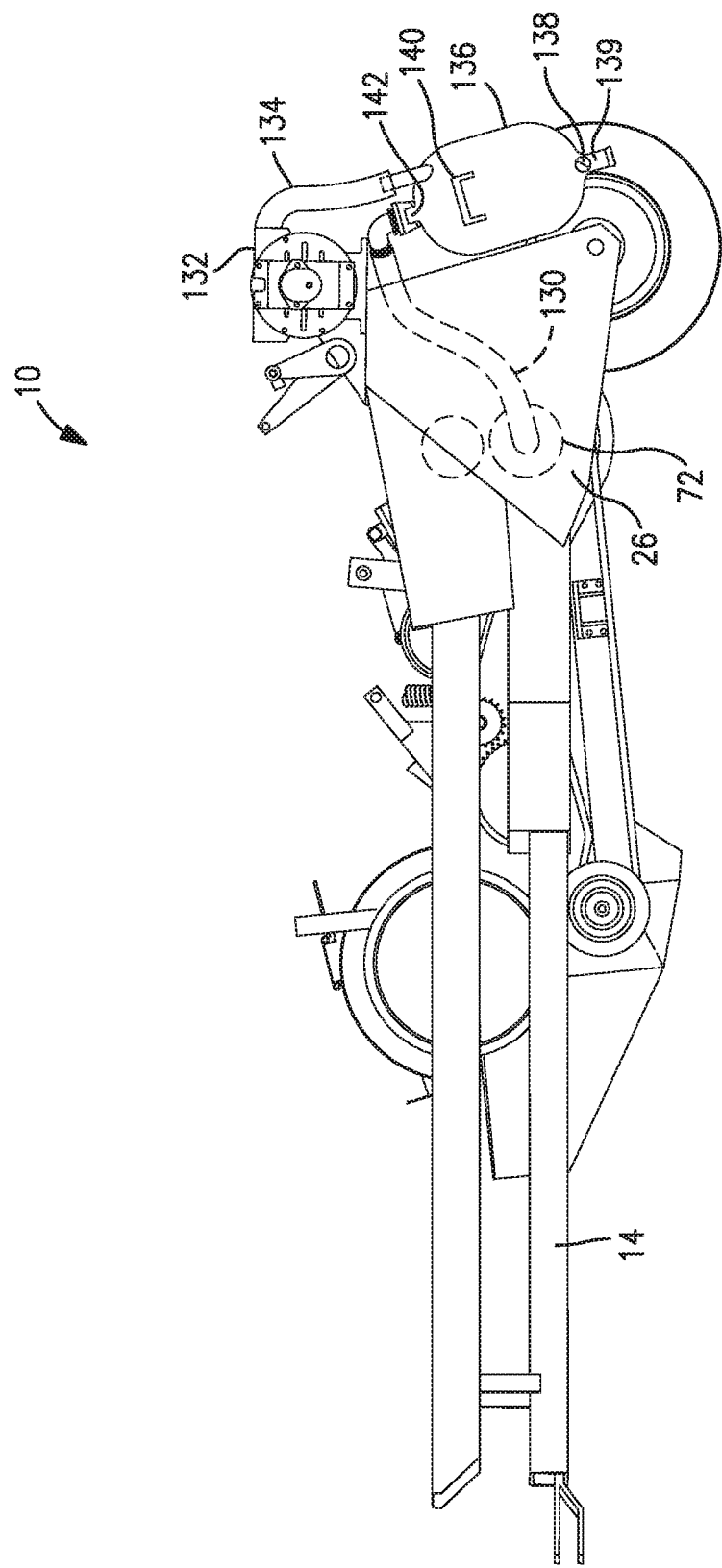
FIG. 12 is a side view of the harvesting machine showing a storage vessel in which the removed liquid is recovered and temporarily stored.

Referring now to FIGS. 7, 8 and 12, the stationary member 82 includes a central bore 126 which runs along the length of the stationary member 82. The central bore 126 has an opening 128 formed at one end. A first conduit or hose 130 is connected to the opening 128. The first conduit 130 can vary in diameter. The diameter of the first conduit 130 can range from between about 2 inches to about 4 inches. A diameter of about 2 inches works well for the first conduit 130. The first conduit 130 connects the central bore 126 of the stationary member 82 to a storage vessel 136. Moisture, in the form of a liquid, is removed from the cut stems 44 of the alfalfa plants 42 and is routed through the central bore 126 of the stationary member 82. From here, liquid and air passes through the opening 128 and through the first conduit 130 to the storage vessel 136. The storage vessel 136 removes the liquid from the air. A second conduit 134 connects the storage vessel 136 to the vacuum pump 132. The diameter of the second conduit 134 can range from between about 2 inches to about 4 inches. A diameter of about 2 inches works well for the second conduit 134.

The vacuum pump 132 is designed to pull a negative pressure value, as was explained above. The vacuum pump 132 can be selected to pull the required amount of vacuum.

The storage vessel 136 can vary in size, shape and configuration. The storage vessel 136 can be formed from various materials, including but not limited to: fiberglass, plastic, thermoplastics, glass, metal, tin, a composite material, or any other material known to those skilled in the art. A desired material is plastic, The storage vessel 136 can hold varying quantities of liquid, One or more storage vessels 136 can be secured to the harvesting machine 10. The storage vessel 136 can be secured to the frame 26. The storage vessel 136 could be removable, if desired. Desirably, the storage vessel 136 is permanently secured to the frame 26.

The storage vessel 136 can vary in the amount of liquid it could hold. The storage vessel 136 could be sized to hold from between about 1 gallon to about 100 gallons of liquid. Desirably, the storage vessel 136 can hold at least about 5 gallons. More desirably, the storage vessel 136 can hold at least about 10 gallons. Even more desirably, the storage vessel 136 can hold at least about 15 gallons. Most desirably, the storage vessel 136 can hold from between about 5 gallons to about 50 gallons. The storage vessel 136 is equipped with a drain valve 138 and a drain pump 139. The drain valve 138 can be any kind or type of drain valve known to those skilled in the art. A fluid level sensor (not shown) can be positioned in the storage vessel 136. The fluid level sensor can be set to a predetermined level, and when the fluid in the storage vessel 136 reaches this level, the fluid level sensor will trigger the drain valve 138 to open. When this occurs, the drain pump 139 will pump the fluid out of the storage vessel 136. Desirably, the drain valve 138 and the drain pump 139 are located at or near the bottom of the storage vessel 136.

The storage vessel 136 can be securely affixed to the frame 26 by a mechanical fastener. Alternatively, the storage vessel 136 can have a unique shape which permits it to be snugly fitted into a receiving area formed on the frame 26. The storage vessel 136 can contain a handle 140, if desired.

It should be understood that the storage vessel 136 is designed to temporarily retain the liquid removed from the stems 44 while the harvesting machine 10 traverses a field. Since the liquid has a nutritional value, it can be later processed to form a liquid supplement which can then be fed to live stock or humans. Alternatively, the liquid can be mixed with other feed and be fed to animals, such as milking cows. Another option is to return the liquid to the field where it would serve as a fertilizer.

Figure 13:
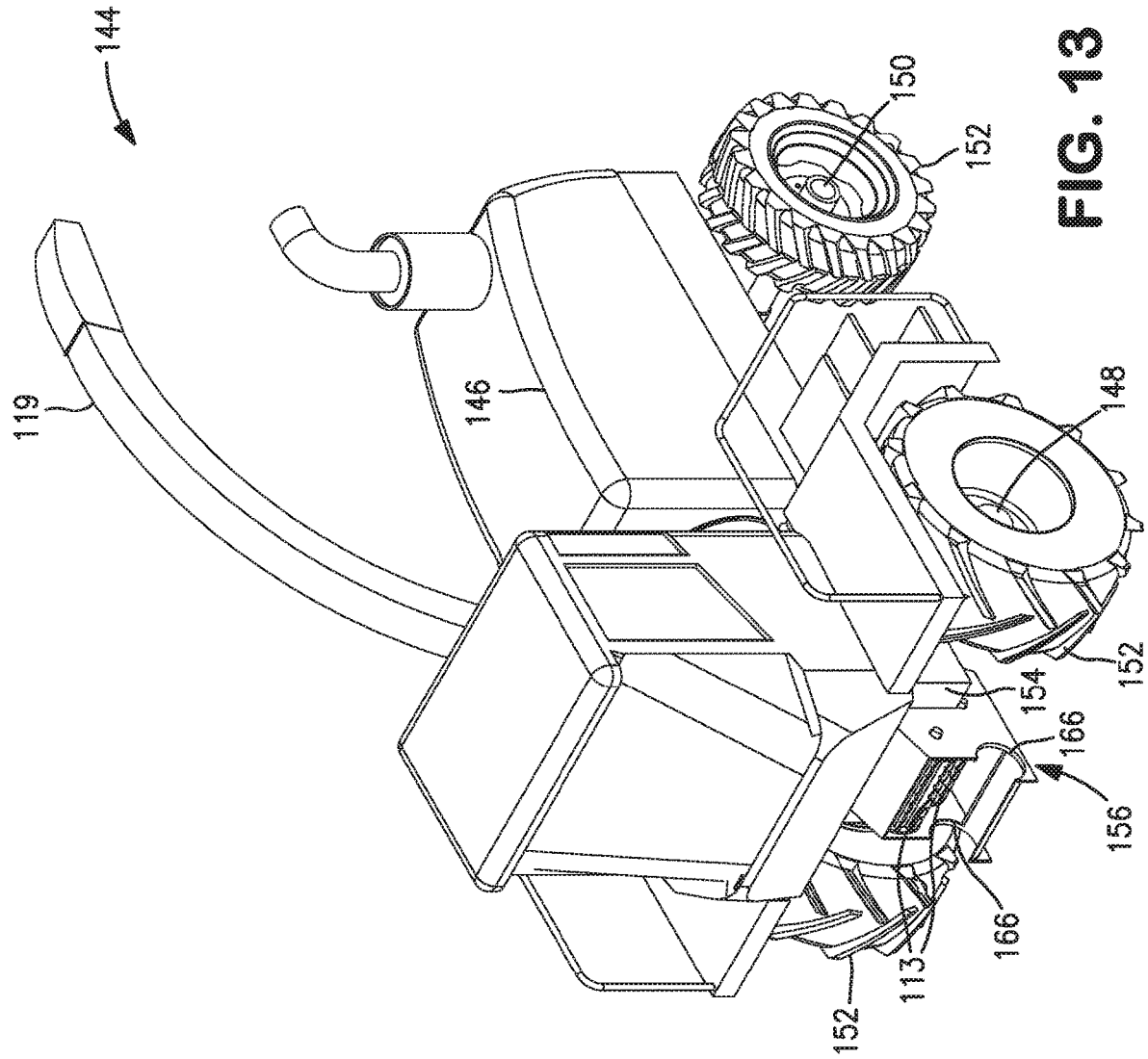
FIG. 13 is a perspective view of a self-propelled unit.

Referring to FIG. 13, a self-propelled unit 144 is shown. By "self-propelled" it is meant containing its own means of propulsion. The self-propelled unit 144 will have its own power source 146, such as an engine, and normally will have two spaced apart axles 148 and 150. Each axle 148 and 150 supports a pair of wheels 152. The self-propelled unit 144 has a front end 154 which contains an attachment mechanism 156. The attachment mechanism 156 can vary in size, shape and design. The attachment mechanism 156 can be a pivot type joint or some other type of device known to those skilled in the art. The self-propelled unit 144 should also include a lift device (not shown) for allowing the attachment mechanism 156 to raise or lower a header 158, see FIG. 14, which can be removably attached to it.

Located rearward or behind the attachment mechanism 156 is a first pair of feed rolls 113, 113. All the mechanisms shown in FIG. 11, to the right of the first pair of feed rolls 113, 113 would be contained in the self-propelled unit 144. This includes structure identical to or similar to the second pair of feed rolls 114, 114 (if needed), the chopper 115, a conveyor chute or housing which can accomplish the same function as the conveyor chute 112, and a blower 118.

Figure 14:
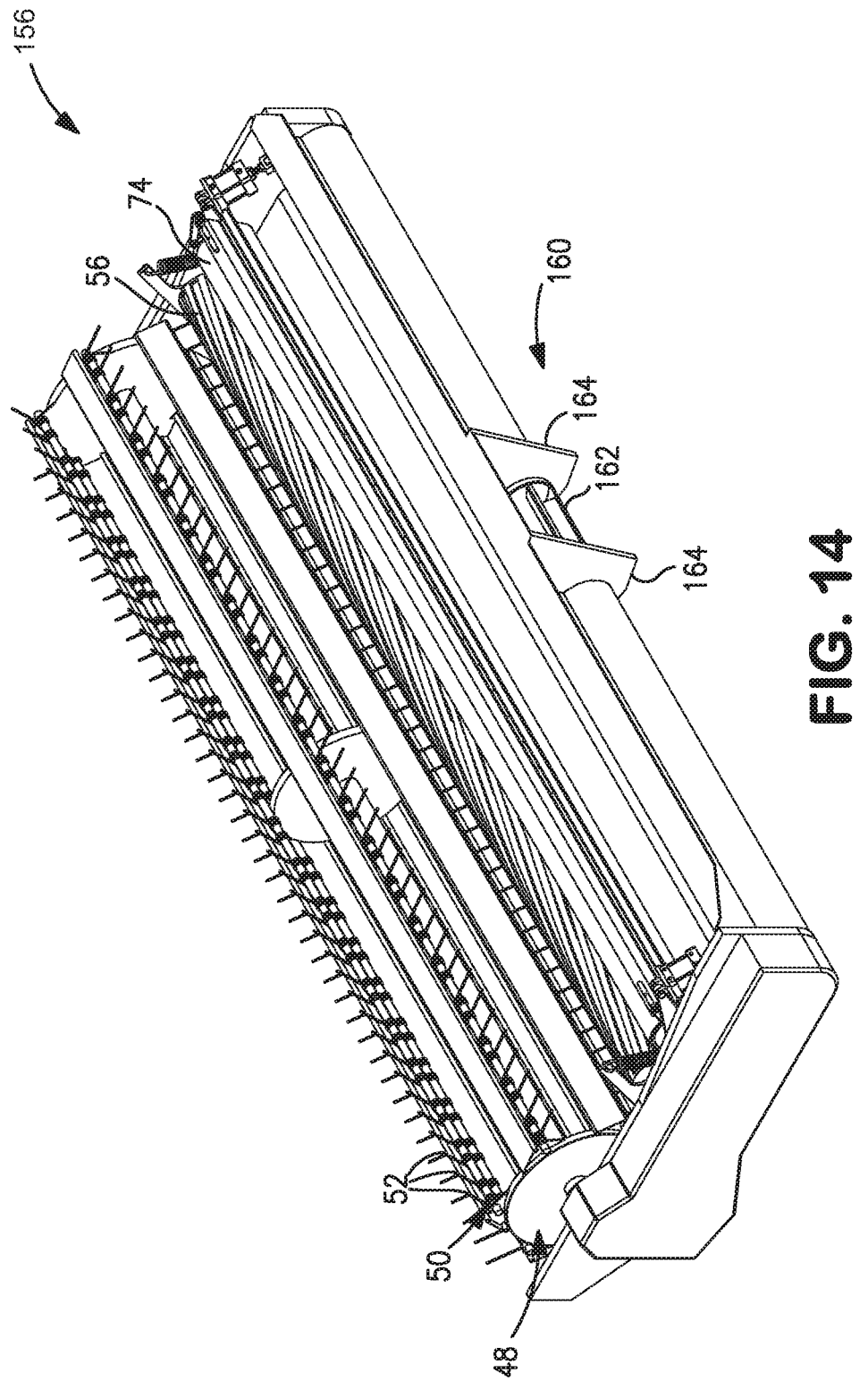
FIG. 14 is a perspective view of a header for harvesting a forage crop is shown which can be attached to a self-propelled unit or be attached to an existing chopper type machine.

Referring to FIG. 14, the header 158 is shown having a connector 160. The connector 160 is sized, shaped and configured to mate with and/or engage with the attachment mechanism 156. Various types of connectors 160, known to those skilled in the art, can be utilized. In the example shown, the connector 160 includes a cylindrical tube 162 which is horizontally aligned. The cylindrical tube 162 is positioned between a pair of side support plates 164, 164. The pair of side support plates 164, 164 are designed to be positioned adjacent to the opposite sides of the attachment mechanism 156, see FIG. 13. The cylindrical tube 162 is sized to mate with a C-shaped channel or structure 166 formed in the attachment mechanism 156, see FIG. 13. It should be understood that the attachment mechanism 156 and the connector 160 can be of various designs.

The header 158 is removable from the attachment mechanism 156. This means that the header 158 can be removed from the attachment mechanism 156 and stored separately when not needed.

The attachment mechanism 156 should be capable of raising and lowering the header 158, when desired. The elevation of the header 158, relative to the ground, can be adjusted for cutting plants 42 at different heights. The attachment mechanism 156 should also be capable of raising the header 158 off the ground, from between about 6 inches to about 36 inches, so that the header 158 can be transported on a paved roadway.

The header 158 includes all the mechanism shown in FIG. 3 from the pick-up head 48 to the pair of augers 110, 110. All the mechanism after the pair of augers 110, 110 would be contained in the self-propelled unit 144. The self-propelled unit 144 could also include the spout 119 for directing the chopped crop into a storage wagon 120.

The header 158 includes the pick-up head 48, the cutting mechanism 54, the crimper mechanism 56, the moving web 68, the moisture removal mechanism 70 and all the mechanical elements and rolls described above with reference to FIGS. 3, 4, 5 and 7-11, up to and including the pair of augers 110, 110.

Referring to FIG. 15, the header 158 is shown attached to the self-propelled unit 144.

It should be understood that the header 158 could also be attached to an existing chopper type machine, which is either self-propelled or pull-type.

Method

A method of operating a harvesting machine 10 is also disclosed. The harvesting machine 10 has a frame 26 with a first end 28 and a second end 30, at least one axle 32 having a pair of wheels 34, 34. The harvesting machine 10 also has a bottom plate 36 positioned adjacent to the first end 28. The bottom plate 36 has a front edge 38 and a rear edge 40. The bottom plate 36 is inclined upward towards the rear edge 40. A pick-up head 48 is rotatably mounted on the first end 28 of the frame 26. The pick-up head 48 has at least two spaced apart and outwardly extending finger sets 50, 50. Each finger set 50, 50 contain a plurality of fingers 52 spaced apart from one another across the width of the pick-up head 48. Each finger set 50, 50 sequentially contact the growing plants 42 in a field. Each plant 42 has a stem 44 containing a relatively high moisture content and a base 46. Each of the finger sets 50, 50 will bend the stems 44 downward onto the bottom plate 36 and towards the incline. A cutting mechanism 54 is mounted on the bottom plate 36 below the pick-up head 48. The cutting mechanism 54 cuts each of the stems 44 at the respective base 46 as the harvesting machine 10 traverses a crop field. A crimper mechanism 56 is positioned adjacent to the rear edge 40 of the bottom plate 36. The crimper mechanism 56 has a driven bottom crimp roll 58 positioned below a biased top crimp roll 60. The top crimp roll 60 is rotatably connected to the bottom crimp roll 58. A first nip 66 is formed between the bottom crimp roll 58 and the top crimp roll 60. The cut stems 44 are directed through the first nip 66 to form a moving web 68. The moving web 68 has a width equal to the width of the pick-up head 48.

A moisture removal mechanism 70 is positioned above and behind the crimper mechanism 56. The moisture removal mechanism 70 has a driven suction roll 72 positioned below a biased press roll 74. The moisture removal mechanism 70 also has an idler roll 94 positioned downstream of the suction roll 72. The idler roll 94 has a smaller diameter than the suction roll 72. A movable wire belt 96 forms a closed loop around both the suction roll 72 and the idler roll 94. The movable wire belt 96 has a plurality of small apertures 98 formed therethrough. A second nip 100 is formed between the wire belt 96 and the press roll 74. The moisture removal mechanism 70 functions to lower the moisture content in the cut stems 44 by squeezing each of the stems 44 and forcing liquid out of an end of each of the stems 44.

A crop converging mechanism 106 is located downstream of the moisture removal mechanism 70. The crop converging mechanism 106 reduces the width of the moving web 68 to a narrow ribbon 108 of cut stems 44. The narrow ribbon 108 has a width of about 30 inches or less. Desirably, the narrow ribbon has a width of about 28 inches. More desirably, the narrow ribbon has a width of about 26 inches. Even more desirably, the narrow ribbon has a width of about 24 inches. The crop converging mechanism 106 including a pair of rotating augers 110, 110 aligned on a common shaft 111. One auger 110 can be a right hand auger and the other auger 110 can be a left hand auger. The pair of augers 110, 110 can forcibly reduce the width of the moving web 68 by causing a portion of the moving web 68 to move towards the center of the moving web 68. A chopper 115 is positioned downstream of the crop converging mechanism 106 and a blower 118 is positioned downstream of the chopper 115.

The method includes the steps of attaching the harvesting machine 10 to a tractor 12 which can pull the harvesting machine 10 back and forth across a crop field for the purpose of harvesting a crop, such as alfalfa. Alternatively, a self propelled harvesting machine 16 can be utilized.

The harvesting machine 10 can be hydraulically, pneumatically, mechanically and/or electrically connected to the tractor 12. The pick-up head 48 will rotate as the harvesting machine 10 is pulled across the crop field. The cutting mechanism 54 is activated to cut each of the stems 44 at the base 46 as the rotating pick-up head 48 advances through the crop field. The pick-up head 48 moves the cut stems 44 along the bottom plate 36 and into contact with the crimper mechanism 56 where the cut stems 44 are directed through the first nip 66 to form a moving web 68. The moving web 68 is then directed through the second nip 100 of the moisture removal mechanism 70 to lower the moisture content of the cut stems 44. This is accomplished by squeezing the stems 44 which pushes the liquid from inside each stem 44 through the end opening in each stem 44. This liquid is then sucked into the suction roll 72 by the negative pressure. The moving web 68, with its reduced moisture content, is directed to the crop converging mechanism 106 wherein the width of the moving web 68 is reduced to form a narrow ribbon 108 having a width of about 30 inches or less. The chopper 115 is then used to chop the narrow ribbon 108 into small pieces 117 and a blower 118 is used to blow the small pieces 117 into a storage wagon 120 for transport to a storage facility 122.

The method is beneficial in lowering and reducing the moisture content in the cut stems 44 of plants 42 by at least about 25%. Desirably, the method can lower and reduce the moisture content in the cut stems 44 of plants 42 by at least about 30%. More desirably, the method can lower and reduce the moisture content in the cut stems 44 of plants 42 by at least about 40%. Even more desirably, the method can lower and reduce the moisture content in the cut stems 44 of plants 42 by at least about 45%. Most desirably, the method can lower and reduce the moisture content in the cut stems 44 of plants 42 by at least about 50%. This can be accomplished when the stationary member 82 is operated to pull a negative pressure ranging from between about −5 psi to about −10 psi.

The method also includes connecting a central bore 126 of the stationary member 82 to a storage vessel 136 using a first conduit 130. The storage vessel 136 is then connected by a second conduit 134 to a vacuum pump 132. The storage vessel 136 is attached to the frame 26 and is equipped with a drain valve 138 and a drain pump 139. Moisture removed from the cut stems 44, in the form of a liquid, and air are routed from the stationary member 82, through the first conduit 130 to the storage vessel 136. From the storage vessel 136, the air is routed to the vacuum pump 132 while the liquid is collected in the storage vessel 136. The liquid is temporarily retained in the storage vessel 136. The collected liquid can be removed through the drain valve 138 by the drain pump 139. This liquid can be used for various purposes, as was explained above.

The method further includes positioning a support plate 102 between the crimper mechanism 56 and the moisture removal mechanism 70. The support plate 102 has a flat, smooth upper surface 104. The support plate 102 functions to prevent the cut stems 44 or portions thereof from falling between the crimper mechanism 56 and the moisture removal mechanism 70. The support plate 102 limits the amount of material that could stick to the exterior surface 76 of the suction roll 72 and interfere with the efficient operation of the harvesting machine 10.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A harvesting machine, comprising:
    a) a frame having a first end and a second end, at least one axle having a pair of wheels, and having a bottom plate positioned adjacent to said first end, said bottom plate having a front edge and a rear edge, and said bottom plate is inclined upward towards said rear edge;
    b) a rotatable pick-up head pivotally mounted on said first end of said frame, said pick-up head having at least two spaced apart and outwardly extending finger sets, each finger set containing a plurality of fingers spaced apart from one another across the width of said pick-up head, each finger set sequentially contacting growing plants in a field, each plant having a stem containing a high moisture content and a base, and each of said finger sets bending said stems downward onto said bottom plate and towards said incline;
    c) a cutting mechanism mounted on said bottom plate below said pick-up head, said cutting mechanism cutting each of said stems at said respective base as said harvesting machine traverses a crop field:
    d) a crimper mechanism positioned adjacent to said rear edge of said bottom plate, said crimper mechanism having a driven bottom crimp roll positioned below a top crimp roll, said top crimp roll is rotatably connected to said bottom crimp roll, a first nip is formed between said bottom crimp roll and said top crimp roll, and said cut stems are directed through said first nip to form a moving web having a width equal to the width of said pick-up head;
    e) a moisture removal mechanism positioned above and behind said crimper mechanism, said moisture removal mechanism having a driven suction roll positioned below a biased press roll, said moisture removal mechanism also having an idler roll positioned behind said suction roll, said idler roll having a smaller diameter than said suction roll, and a wire belt forming a closed loop around both said suction roll and said idler roll, said wire belt having a plurality of small apertures formed therethrough, a second nip is formed between said wire belt and said press roll, and said moisture removal mechanism lowering said moisture in said cut stems;
    f) a crop converging mechanism located downstream of said moisture removal mechanism, said crop converging mechanism reducing the width of said moving web to a narrow ribbon having a width of less than about 30 inches, and said crop converging mechanism including a pair of rotating augers aligned on a common axis which can forcibly reduce the width of said moving web;
    g) a chopper positioned downstream of said crop converging mechanism for chopping said narrow ribbon into small pieces; and
    h) a blower for moving said small pieces into a storage wagon for transport to storage.

2. The harvesting machine of claim 1 wherein said suction roll includes a rotatable hollow aluminum tube having an exterior surface, an interior surface, and a circumference, and a plurality of apertures are formed through said hollow tube, said apertures having a diameter of less than about 0.25 inches, and a stationary member positioned within said hollow tube, said stationary member includes a pair of seals arranged to form an opening into a center portion of said stationary member, and said pair of seals are biased against said interior surface of said hollow tube.

3. The harvesting machine of claim 1 wherein said harvesting machine is pulled behind a tractor, and said stationary member can pull a negative pressure ranging from between about −5 psi to about −10 psi.

4. The harvesting machine of claim 2 wherein said harvesting machine is a self-propelled unit, and said pair of seals are formed from nylon, and each of said pair of seals is biased against said interior surface of said suction roll by a spring.

5. The harvesting machine of claim 2 wherein said pair of seals is formed from a high-strength, resilient synthetic polymer, and each of said pair of seals is biased against said interior surface of said suction roll by an air load tube.

6. The harvesting machine of claim 1 wherein said press roll is a steel roll coated with rubber, and said press roll is biased against said wire belt by a hydraulic, pneumatic or a mechanical device.

7. The harvesting machine of claim 1 wherein said suction roll and said press roll have the same diameter, said stationary suction member can pull a negative pressure of at least −5 psi, and said suction roll rotates clockwise and said press roll rotates counterclockwise.

8. The harvesting machine of claim 1 further comprising a support plate positioned between said crimper mechanism and said moisture removal mechanism, said support plate having a flat, smooth upper surface, and said support plate preventing said cut stems from falling between said crimper mechanism and said moisture removal mechanism.

9. The harvesting machine claim 1 wherein said suction roll has a longitudinal central axis and said idler roll has a longitudinal central axis, and said longitudinal central axis of said idler roll is located in a plane located above and downstream of said longitudinal central axis of said suction roll.

10. A harvesting machine, comprising:
    a) a frame having a first end and a second end, at least one axle having a pair of wheels, and having a bottom plate positioned adjacent to said first end, said bottom plate having a front edge and a rear edge, and said bottom plate is inclined upward towards said rear edge;

b) a rotatable pick-up head pivotally mounted on said first end of said frame, said pick-up head having at least two spaced apart and outwardly extending finger sets, each finger set containing a plurality of fingers spaced apart from one another across the width of said pick-up head, each finger set sequentially contacting growing plants in a field, each plant having a stem containing a high moisture content and a base, and each of said finger sets bending said stems downward onto said bottom plate and towards said incline;

c) a cutting mechanism mounted on said bottom plate below said pick-up head, said cutting mechanism cutting each of said stems at said respective base as said harvesting machine traverses a crop field;

d) a crimper mechanism positioned adjacent to said rear edge of said bottom plate, said crimper mechanism having a driven bottom crimp roll positioned below a biased top crimp roll, said top crimp roll is rotatably connected to said bottom crimp roll, a first nip is formed between said bottom crimp roll and said top crimp roll, and said cut stems are directed through said first nip to form a moving web having a width equal to the width of said pick-up head;

e) a moisture removal mechanism positioned above and behind said crimper mechanism, said moisture removal mechanism having a driven suction roll positioned below a biased press roll, said moisture removal mechanism also having an idler roll positioned behind said suction roll, said idler roll having a smaller diameter than said suction roll, and a wire belt forming a closed loop around both said suction roll and said idler roll, said wire belt having a plurality of small apertures formed therethrough, a second nip is formed between said wire belt and said press roll, a stationary member is positioned within said suction roll which can pull a negative pressure ranging from between about −5 psi to about −10 psi, said stationary member having a pair of seals arranged to form an opening into a center portion of said stationary member, said pair of seals are biased against an interior surface of said suction roll, and said moisture removal mechanism lowers said moisture content in said cut stems by at least 30%;

f) a crop converging mechanism located downstream of said moisture removal mechanism, said crop converging mechanism reducing the width of said moving web to a narrow ribbon having a width of about 24 inches, and said crop converging mechanism including a pair of rotating augers aligned on a common shaft, said pair of rotating augers forcibly reducing the width of said moving web;

g) a chopper positioned downstream of said crop converging mechanism for chopping said narrow ribbon into small pieces; and h) a blower for moving said small pieces into a storage wagon for transport to storage.

11. The harvesting machine of claim 10 wherein said suction roll has a diameter of at least 9.5 inches, said press roll has a diameter larger than said suction roll, said suction roll and said press roll having the same length, and said pressure roll exerts a pressure on said wire belt ranging from between about 50 pounds per linear inch to about 100 pounds per linear inch.

12. The harvesting machine of claim 10 wherein said apertures formed in said wire belt have a rectangular configuration, each having a length of about 0.03 inches and a width of about 0.01 inches.

13. The harvesting machine of claim 10 wherein said apertures formed in said wire belt are at least about 25% smaller in area than said apertures formed in suction roll.

14. The harvesting machine of claim 10 further comprising a first conduit connecting a central bore of said stationary member to a storage vessel, and a second conduit connecting said storage vessel to a vacuum pump, said storage vessel attached to said frame and equipped with a drain valve, whereby moisture content removed from said cut stems, in the form of a liquid, and air are routed from said stationary member through said first conduit to said storage vessel, and said air is routed from said storage vessel to said vacuum pump while said liquid is temporarily retained in said storage vessel.

15. The harvesting machine of claim 10 wherein said press roll has an exterior surface and a doctor blade is positioned to contact said exterior surface of said press roll, said doctor blade is located downstream of said second nip, and said doctor blade removes any stems that may cling to said exterior surface of said press roll.

16. A method of operating a harvesting machine, said harvesting machine having a frame with a first end and a second end, at least one axle having a pair of wheels, and having a bottom plate positioned adjacent to said first end, said bottom plate having a front edge and a rear edge, and said bottom plate is inclined upward towards said rear edge; a rotatable pick-up head pivotally mounted on said first end of said frame, said pick-up head having at least two spaced apart and outwardly extending finger sets, each finger set containing a plurality of fingers spaced apart from one another across the width of said pick-up head, each finger set sequentially contacting growing plants in a field, each plant having a stem containing a relatively high moisture content and a base, and each of said finger sets bending said stems downward onto said bottom plate and towards said incline; a cutting mechanism mounted on said bottom plate below said pick-up head, said cutting mechanism cutting each of said stems at said respective base as said harvesting machine traverses a crop field; a crimper mechanism positioned adjacent to said rear edge of said bottom plate, said crimper mechanism having a driven bottom crimp roll positioned below a biased top crimp roll, said top crimp roll is rotatably connected to said bottom crimp roll, a first nip is formed between said bottom crimp roll and said top crimp roll, and said cut stems are directed through said first nip to form a moving web having a width equal to the width of said pick-up head; a moisture removal mechanism positioned above and behind said crimper mechanism, said moisture removal mechanism having a driven suction roll positioned below a biased press roll, said moisture removal mechanism also having an idler roll positioned downstream of said suction roll, said idler roll having a smaller diameter than said suction roll, and a wire belt forming a closed loop around both said suction roll and said idler roll, said wire belt having a plurality of small apertures formed therethrough, a second nip is formed between said wire belt and said press roll, and said moisture removal mechanism lowering said moisture content in said cut stems by squeezing each of said stems, which action forces liquid out of an end of each stem; a crop converging mechanism located downstream of said moisture removal mechanism, said crop converging mechanism reducing the width of said moving web to a narrow ribbon, and said crop converging mechanism including a pair of rotating augers aligned on a common axis, said pair of augers forcibly reducing the width of said moving web; a chopper is positioned downstream of said crop converging mechanism and a blower is positioned downstream of said chopper, said method comprising the steps of:
- a) attaching said harvesting machine to a tractor which can pull said harvesting machine back and forth across a crop field for the purpose of harvesting a crop, said harvesting machine being hydraulically, pneumatically, mechanically and/or electrically connected to said tractor;
- b) rotating said pick-up head as said harvesting machine is pulled across said crop field;
- c) activating said cutting mechanism to cut each of said stems at said stem base as said pick-up head advances through said crop field;
- d) using said rotating pick-up head to move said cut stems along said bottom plate and into contact with said crimper mechanism where said cut stems are directed through said first nip to form a moving web;
- e) directing said moving web through said second nip of said moisture removal mechanism to lower said moisture content of said cut stems by forcing said liquid out of each stem;
- f) directing said moving web having a reduced moisture content to said crop converging mechanism wherein the width of said moving web is reduced to form a narrow ribbon having a width of about 30 inches or less;
- g) using said chopper to chop said narrow ribbon into small pieces; and
- h) using a blower to blow said small pieces into a storage wagon for transport to a storage facility.

17. The method of claim 16 further comprising lowering said moisture content in said cut stems by at least about 25%, and operating said stationary member to pull a negative pressure ranging from between about −5 psi to about −10 psi.

18. The method of claim 16 further comprising connecting a central bore of said stationary member to a storage vessel using a first conduit, and connecting said storage vessel to a vacuum pump using a second conduit, said storage vessel attached to said frame and equipped with a drain valve, whereby moisture content removed from said cut stems, in the form of a liquid, and air are routed from said stationary member through said first conduit to said storage vessel, and said air is routed from said storage vessel to said vacuum pump while said liquid is temporarily retained in said storage vessel.

19. The method of claim 16 further comprising positioning a support plate between said crimper mechanism and said moisture removal mechanism, said support plate having a flat, smooth upper surface, and said support plate functioning to prevent said cut stems or portions thereof from falling between said crimper mechanism and said moisture removal mechanism.

20. The method of claim 16 further comprising lowering said moisture content in said cut stems by at least 50%, and operating said stationary member to pull a negative pressure ranging from between about −5 psi to about −10 psi.

21. A header for attachment to a self-propelled unit or to a chopper type machine, which is either self-propelled or a pull-type unit, comprising:
- a) a frame having a first end and a second end, and having a bottom plate positioned adjacent to said first end, said bottom plate having a front edge and a rear edge, and said bottom plate is inclined upward towards said rear edge;
- b) a rotatable pick-up head pivotally mounted on said first end of said frame, said pick-up head having at least two spaced apart and outwardly extending finger sets, each finger set containing a plurality of fingers spaced apart from one another across the width of said pick-up head, each finger set sequentially contacting growing plants in a field, each plant having a stem containing a high moisture content and a base, and each of said finger sets bending said stems downward onto said bottom plate and towards said incline;
- c) a cutting mechanism mounted on said bottom plate below said pick-up head, said cutting mechanism cutting each of said stems at said respective base as said harvesting machine traverses a crop field;
- d) a crimper mechanism positioned adjacent to said rear edge of said bottom plate, said crimper mechanism having a driven bottom crimp roll positioned below a top crimp roll, said top crimp roll is rotatably connected to said bottom crimp roll, a first nip is formed between said bottom crimp roll and said top crimp roll, and said cut stems are directed through said first nip to form a moving web having a width equal to the width of said pick-up head;
- e) a moisture removal mechanism positioned above and behind said crimper mechanism, said moisture removal mechanism having a driven suction roll positioned below a biased press roll, said moisture removal mechanism also having an idler roll positioned behind said suction roll, said idler roll having a smaller diameter than said suction roll, and a wire belt forming a closed loop around both said suction roll and said idler roll, said wire belt having a plurality of small apertures formed therethrough, a second nip is formed between said wire belt and said press roll, and said moisture removal mechanism lowering said moisture in said cut stems; and
- f) a crop converging mechanism located downstream of said moisture removal mechanism, said crop converging mechanism reducing the width of said moving web to a narrow ribbon having a width of less than about 30 inches, and said crop converging mechanism including a pair of rotating augers aligned on a common axis which can forcibly reduce the width of said moving web.

* * * * *

UNITED STATES PATENT AND TRADEMARK OFFICE
CERTIFICATE OF CORRECTION

PATENT NO. : 10,694,666 B2  
APPLICATION NO. : 15/953675  
DATED : June 30, 2020  
INVENTOR(S) : Rodger J. Baum et al.

Page 1 of 1

It is certified that error appears in the above-identified patent and that said Letters Patent is hereby corrected as shown below:

On the Title Page

Item (72), replace "Rodger J Baum" with --Rodger J. Baum--;
Item (72), replace "William J Powel-Smith" with --William J. Powel-Smith--;

In the Drawings

Sheet 4, FIG. 4, replace reference numeral "74" with --74, 76--;

In the Specification

Column 5, Line 57, replace "suction roll 70" with --suction roll 72--;
Column 7, Line 27, replace "suction roll 70" with --suction roll 72--;
Column 7, Line 30, replace "suction roll 70" with --suction roll 72--;
Column 7, Lines 32-33, replace "suction roll 70" with --suction roll 72--;
Column 7, Line 35, replace "suction roll 70" with --suction roll 72--;
Column 7, Line 37, replace "suction roll 70" with --suction roll 72--;
Column 8, Line 58, replace "wire belt 98" with --wire belt 96--;
Column 9, Line 6, replace "second nip 66" with --second nip 100--;
Column 10, Line 32, replace "common shaft 11" with --common shaft 111--;
Column 10, Line 53, replace "114, 144" with --114, 114--;
Column 12, Line 39, replace "see FIG. 14" with --see FIG. 15--;
Column 12, Line 49, replace "FIG. 14" with --FIGS. 14 and 15--; and
Column 13, Line 9, between "158" and "includes", insert --, shown in FIG. 15,--.

Signed and Sealed this  
Third Day of November, 2020

Andrei Iancu  
*Director of the United States Patent and Trademark Office*